US 10,781,871 B2

(12) United States Patent
Lavezzi

(10) Patent No.: US 10,781,871 B2
(45) Date of Patent: Sep. 22, 2020

(54) DISC BRAKE CALIPER BODY

(71) Applicant: FRENI BREMBO S.P.A., Curno, Bergamo (IT)

(72) Inventor: Roberto Lavezzi, Curno (IT)

(73) Assignee: Freni Brembo S.p.A., Curno, Bergamo (IT)

(*) Notice: Subject to any disclaimer, the term of this patent is extended or adjusted under 35 U.S.C. 154(b) by 0 days.

(21) Appl. No.: 16/089,432

(22) PCT Filed: Mar. 30, 2017

(86) PCT No.: PCT/IB2017/051826
§ 371 (c)(1),
(2) Date: Sep. 28, 2018

(87) PCT Pub. No.: WO2017/168363
PCT Pub. Date: Oct. 5, 2017

(65) Prior Publication Data
US 2019/0120305 A1    Apr. 25, 2019

(30) Foreign Application Priority Data
Mar. 31, 2016  (IT) .................. 102016000033188

(51) Int. Cl.
F16D 65/00      (2006.01)
F16D 55/225     (2006.01)
(Continued)

(52) U.S. Cl.
CPC ....... F16D 65/0068 (2013.01); F16D 55/225 (2013.01); F16D 55/226 (2013.01);
(Continued)

(58) Field of Classification Search
CPC ............. F16D 65/0068; F16D 65/0056; F16D 55/226; F16D 2055/0016
See application file for complete search history.

(56) References Cited

U.S. PATENT DOCUMENTS 4,448,287 A * 5/1984 Katagiri ................ F16D 55/227
188/264 A
4,485,897 A * 12/1984 Kawaguchi ........... F16D 55/227
188/73.31
(Continued)

FOREIGN PATENT DOCUMENTS

EP      1085229 A1   3/2001
EP      1515060 A1   3/2005
(Continued)

OTHER PUBLICATIONS

European Patent Office, International Search Report with Written Opinion, issued in PCT/IB2017/051927, dated Jul. 11, 2017, 11 pages, Rijswijk, Netherlands.

Primary Examiner — Xuan Lan Nguyen
(74) Attorney, Agent, or Firm — Marshall & Melhorn, LLC

(57) ABSTRACT

A disc brake caliper body, having a second elongated element on a side opposed to a wheel has at least two portions each defining a connecting seat adapted for the connection of the caliper body to a support element for supporting the caliper to a vehicle. At least one thrust device seat faces freely in an axial direction so that the at least one thrust device seat can be accessed entirely along straight directions parallel to the axial direction avoiding to interfere with the caliper body.

10 Claims, 15 Drawing Sheets

(51) Int. Cl.
*F16D 55/226* (2006.01)
*F16D 55/00* (2006.01)
(52) U.S. Cl.
CPC .. *F16D 65/0056* (2013.01); *F16D 2055/0008* (2013.01); *F16D 2055/0016* (2013.01)

(56) References Cited

U.S. PATENT DOCUMENTS

| | | | |
|---|---|---|---|
| 6,935,468 B2* | 8/2005 | Regazzoni | B62K 19/38 188/71.1 |
| 7,275,624 B2* | 10/2007 | Gogo | F16D 55/22655 188/18 A |
| 7,407,043 B2 | 8/2008 | Fujita et al. | |
| 7,673,724 B2 | 3/2010 | Baumgartner et al. | |
| 7,708,124 B1* | 5/2010 | Rackers | B60B 35/16 188/250 F |
| 7,793,765 B2* | 9/2010 | Valvano | F16D 55/227 188/71.5 |
| 7,797,812 B2* | 9/2010 | Nanri | F16D 55/228 188/73.46 |
| 8,887,875 B2* | 11/2014 | Gherardi | F16D 55/224 188/71.1 |

FOREIGN PATENT DOCUMENTS

| | | |
|---|---|---|
| JP | 2011094767 A | 5/2011 |
| JP | 5297341 B2 | 9/2013 |
| WO | 90/07443 A1 | 7/1990 |

* cited by examiner

DISC BRAKE CALIPER BODY

FIELD OF THE INVENTION

The present invention relates to a disc brake caliper body and to a caliper comprising such a body and to a braking system comprising such a caliper and a support element of a brake caliper.

In particular, in a fixed type disc brake caliper body, the disc brake caliper body does not slide with respect to a support thereof and is adapted to be arranged astride a floating type brake disc, also known as sliding on a support thereof so as to modify its position along a direction axial thereto to either approach or move away from at least one brake pad. Said brake disc has a first brake disc braking surface and an opposed second brake disc braking surface. The caliper body of the present invention comprises a first wheel side elongated element, i.e. facing the vehicle wheel, comprising a first elongated element caliper outer side and a first elongated element caliper inner side, wherein said first elongated element caliper outer side is adapted to face the vehicle wheel. Said caliper body has at least one portion of the first elongated element caliper inner side adapted to face said axially sliding first brake disc braking surface.

Said caliper body further comprises a second elongated element on the side opposed to the wheel having a second elongated element caliper outer side and a second elongated element caliper inner side. At least one portion of the second elongated element caliper inner side is adapted to face said second brake disc braking surface.

Said first wheel side elongated element comprises at least one thrust means seat adapted to receive thrust means adapted to bias a first pad against said first brake disc braking surface, brake disc, which being floating in turn abuts against an opposed second pad by means of its second braking surface, to apply a braking action on the vehicle.

Said first wheel side elongated element comprises at least one sliding element adapted for the relative sliding of said first pad biased by the thrust means with respect to said caliper body.

Said second elongated element on the side opposed to the wheel comprises at least one pad resting surface adapted for the at least partial resting of the second opposed pad firmly against the caliper body, preventing this second pad from being biased by any thrust means movable with respect to the caliper body itself.

Said caliper body comprises at least one connecting bridge of the elongated elements, which bridge is adapted to connect said first wheel side elongated element to said second elongated element on the side opposed to the wheel, so as to be adapted to be arranged astride said brake disc.

Even more particularly, the present invention relates to a brake caliper for a motorcycle or two-wheel motor vehicle, where the side opposed to the wheel is the side facing the outside of the motor vehicle.

PRIOR ART

In a disc brake, the brake caliper is generally arranged astride the outer peripheral margin of a brake disc, adapted to rotate about a rotational axis defining an axial direction (X-X). In a disc brake, a radial direction (R-R), arranged substantially orthogonal to said axial direction (X-X), and a tangential or circumferential direction (C-C), orthogonal to both said axial direction (X-X) and said radial direction (R-R) is further defined.

The brake calipers are constrained to a support structure which remains stationary with respect to the vehicle wheel, such as, for example, a spindle of a vehicle suspension or a vehicle wheel hub or a fork or swingarm of a motor vehicle. The brake caliper usually has a caliper body comprising two elongated portions arranged so as to face opposed braking surfaces of a brake disc, and at least one bridge, which connects said two elongated portions to each other.

In a typical arrangement of a disc brake on a motor vehicle, a braking surface of the brake disc faces towards the outside of the motor vehicle, defining the disc brake outer motor vehicle side, and the opposed braking surface of the brake disc faces towards the motor vehicle wheel, defining the wheel side of the disc brake. So, when the brake caliper is mounted on a brake disc, a first elongated portion of the caliper body is on the outer side of the motor vehicle and a second elongated portion of the caliper body is on wheel side. Clutch pads are provided arranged between each elongated portion of the caliper body and the facing braking surfaces of the brake disc.

In floating caliper bodies associated with fixed discs, a floating portion of the caliper body has a cylinder, or cylinders, adapted to accommodate hydraulic pistons capable of applying a thrust action on the friction pads facing it, abutting it against the braking surface of the disc, while sliding on the bracket, or fixed portion of the caliper, and acts on the second clutch pad abutting it against the brake disc to apply the braking action on the motor vehicle.

In fixed caliper bodies associated with fixed discs, a cylinder, or cylinders, is or are present on both opposed sides of the caliper body, adapted to accommodate hydraulic pistons capable of applying a thrust action on the friction pad facing it, abutting it against the braking surface of the disc, without needing to move the brake disc axially, abutting both opposed brake pads against the opposed braking surfaces of the brake disc to apply the braking action on the motor vehicle.

Otherwise, fixed caliper bodies are also known associated with fixed discs, wherein only one of the elongated portions of the caliper body has a cylinder, or cylinders, adapted to accommodate hydraulic pistons capable of applying a thrust action on the friction pad facing it, abutting it against the braking surface of the disc, which in turn axially slides on its support and abuts against the second clutch pad to apply the braking action on the motor vehicle.

This braking action on the motor vehicle applies a considerable friction adapted to create the desired braking torque on the motor vehicle itself, the braking torque in all cases contextually biases and deforms the caliper body itself away from the brake disc. This phenomenon is known as elastic deformation or "strain" of the caliper, which by moving away from the brake disc forces a further bias of the hydraulic pistons on the pad to apply the desired braking action.

When the braking action ceases, and thus when the bias which deforms the caliper body away from the brake disc ceases, the caliper body returns to its undeformed rest configuration, approaching the brake disc again, and thus approaching the pads to the braking surfaces.

This approaching of the pads to the brake disc is undesired because it determines a contact, albeit minor, between pad and disc, which determines a continuous minor friction and thus a braking action, also known as residual braking torque, also when the braking command by the driver of the vehicle or motor vehicle ceases.

This residual braking torque is often considered undesired because it generates noise, albeit minor, caused by the friction action between pads and disc braking surfaces, an undesired wear of the pads and of the brake disc, which implies more frequent maintenance for their replacement, and a minimum fuel consumption for feeding the drive unit with the energy, even if minimum, needed to overcome this residual torque.

Partially, this phenomenon known as elastic deformation or "strain" of the brake caliper is compensated by providing rollback devices in the piston-cylinder interface, which retract the piston into its cylinder by a limited predetermined entity, moving it away from the respective pad and thus allowing the pad, biased in turn by a spring, to move away from the disc, reducing the undesired residual torque.

However, in the case of fixed calipers coupled with floating or axially sliding discs, these known rollback devices are present only on the side of the caliper provided with thrust means, leaving the opposed side free to be "strained" between the deformed position and the undeformed position, which side approaches the pad again forcing it slightly onto the respective braking surface of the brake disc.

In particular, worth noting is the simultaneous absence of thrust devices, and thus of rollback devices, on the side opposed to the wheel and the provision of a less resistant elongated element, precisely because it is free from the structure which surrounds and accommodates the pad thrust means, which are absent here, and which with their structure increase the local stiffness of the caliper body which is less deformed when undergoes the braking action.

However, for automotive applications, and in particular for sports cars with carbon discs suited for braking with violent decelerations only capable of producing the necessary temperature to obtain the required friction, known calipers of this type are described in EP1085229A1, by the applicant, for use in Formula 1, and in WO9007443A1 by ELF France. These known solutions, precisely because they are suited for high-performance sports cars, rarely address the problem of residual torque, which is sometimes seen as a positive factor, not for the residual braking torque, but for the position of the brake pads already abutting on the braking surfaces and thus immediately reactive to the driver's braking command. In other words, on sports cars, the presence of a minor residual torque is accepted in order to have prompt, reactive, immediate braking at the first suggestion of command by the driver, preventing the pad from performing an even minimum approach path to the disc braking surface.

On vehicles for everyday use, instead, the need to reduce the elastic deformation of the caliper body, or "strain" of the caliper body, is strongly felt, above all if the caliper is of fixed type associated with a floating disc, in which the thrust means are provided on a single side of the caliper body itself, in order to either reduce or entirely avoid the contact of the brake pad on the braking surface when the driver's braking command ceases, and thus avoiding the presence of a residual braking torque.

Solution

It is the object of the present invention to solve the drawbacks of the prior art and to provide a solution to the needs of providing a fixed type caliper body suited for floating brake discs, capable of controlling the deformation of the side free from the thrust means, and thus to limit the elastic deformation or "strain" of the caliper body.

Therefore, it is a further object to reduce the residual braking torque of the caliper, reduce the noise of the disc brake in absence of braking, and reduce the pads and brake disc wear.

These and other objects are achieved by a caliper body according to claim 1, as well as a brake caliper according to claim 11, a brake according to claim 12, and a motor vehicle according to claim 14.

Some advantageous embodiments are the subject of the dependent claims.

By providing a brake caliper according to the claims, the need is satisfied to limit the deformation of the caliper body, in its portion free from thrust means, thus reducing the overall deformation, i.e. the movement of the caliper body passing from a biased state and deformed state thereof to a non-biased and undeformed state, either reducing or eliminating, as a consequence, the residual braking torque, as well as the noise generated in unbraked running conditions of the vehicle or motor vehicle and the wear of the braking system and, above all, of the pads and of the brake disc.

Furthermore, by virtue of the suggested solutions, a brake caliper which is easy to assemble on its support system is provided, and thus with easy maintenance of the braking system, because the caliper connecting means are more easily accessible.

Furthermore, by virtue of the suggested solutions, the number of caliper components can be reduced to the advantage of reduced construction complexity and of greater operating reliability.

According to some embodiments, easier maintenance can be achieved by providing the feeding pipe and purge valve arranged near the outer side of the elongated elements on the side opposed to the wheel, and thus of rapid and simple access and use.

By virtue of the suggested support element, above all the caliper body portion free from thrust means can be further stiffened. Furthermore, advantageously in some embodiments, the support directly abuts the pad, making the reaction of the braking action not only more rigid but also allowing a contact and a direct thermal transfer of the heat produced by the braking and present in the pads to the support instead of to the caliper body, with a better disposal thereof.

By virtue of the suggested solutions, the caliper body provides the fixing to a support on one side, or elongated element, and the seat for the thrust means, e.g. a piston, on another side, or elongated element, opposed to and not connected to the support. By virtue of this configuration, the movement of the thrust means can be controlled better and the elastic deformation of the caliper body during the braking steps of the vehicle can be controlled and compensated better, resulting in an accurate "lever point", or position of the braking lever in which the driver feels the braking action at the required intensity and, above all, with a repeatability which confers a high feeling of vehicle driving safety.

By virtue of the suggested solutions, the caliper body provides the thrust means on the side opposed to the support, i.e. on the side of the brake caliper which is more heavily subjected to an elastic deformation when the braking action on the vehicle is applied with the caliper. This arrangement of the thrust means always takes the floating brake disc towards the brake pad resting on the side of the caliper body connected to the caliper support, side which is deformed less as a result of the braking action, ensuring higher control on the effective brake disc position during operation.

The suggested solutions may be applied to racing motorcycles, as well as to motor vehicles, scooters, Trike™ bikes, three-wheel motorcycles or scooters, such as MP3® made by Piaggio S.p.A., BRP Spyder, such as, for example, Can-Am Spyder and other three-wheel motorcycles, and snowmobiles. According to the application, changes will be made which however do not modify the concept of the present invention.

FIGURES

Further features and advantages of the caliper body will become apparent from the description provided below of preferred embodiments thereof, given for illustrative but not limiting purposes, with reference to the accompanying drawings, in which.

Figure 1:
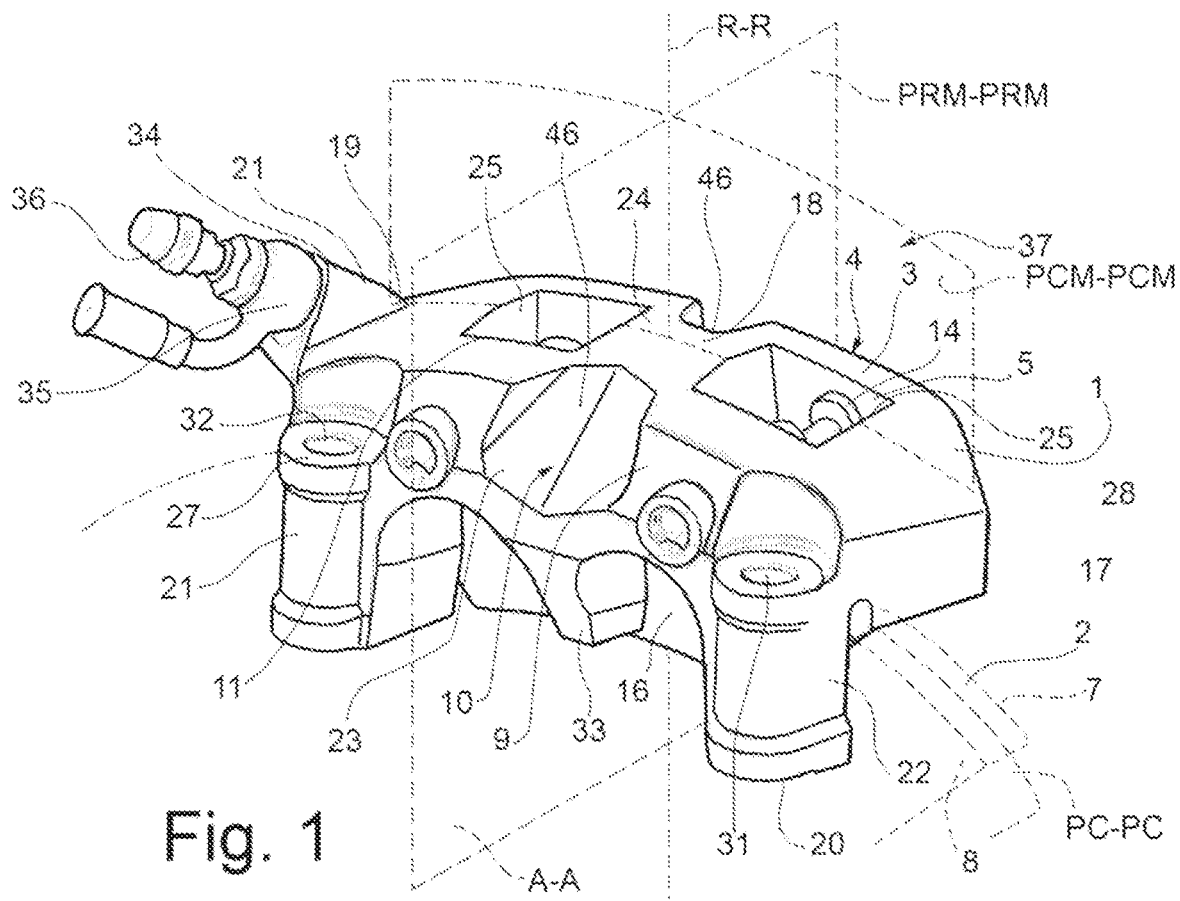
FIG. 1 is an axonometric view of a caliper with radial attachment of the side opposed to the wheel.
Figure 2:
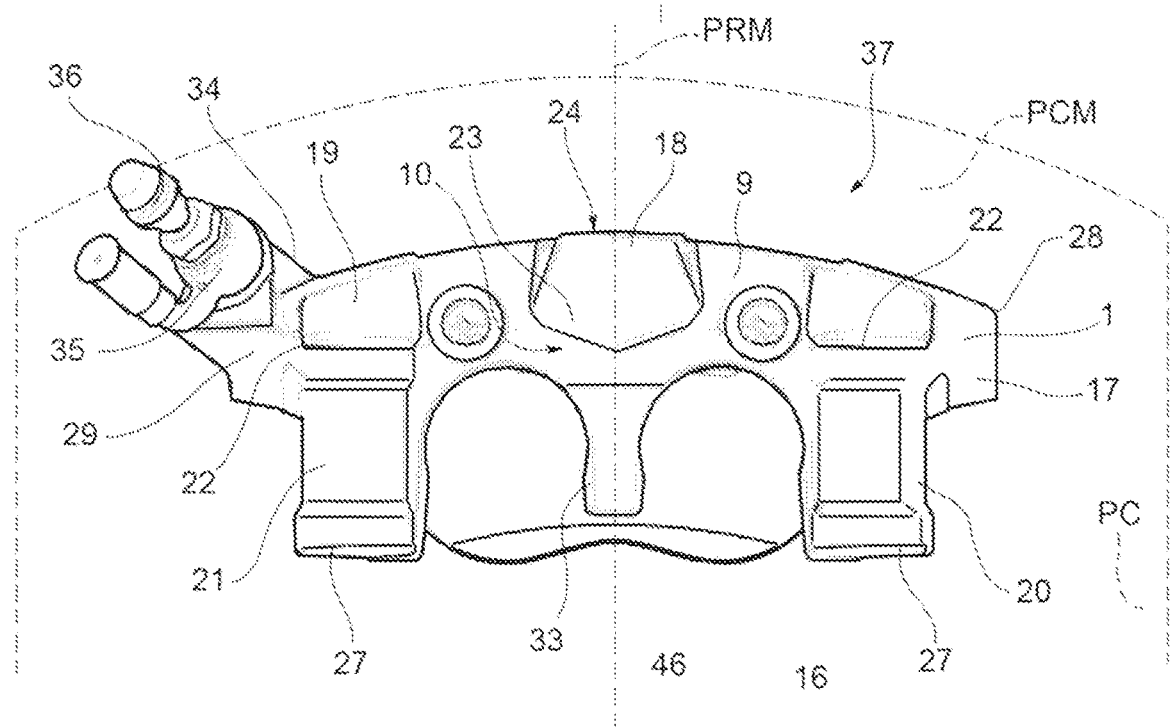
FIG. 2 is a front view of the caliper of FIG. 1 of the side opposed to the wheel.
Figure 3:
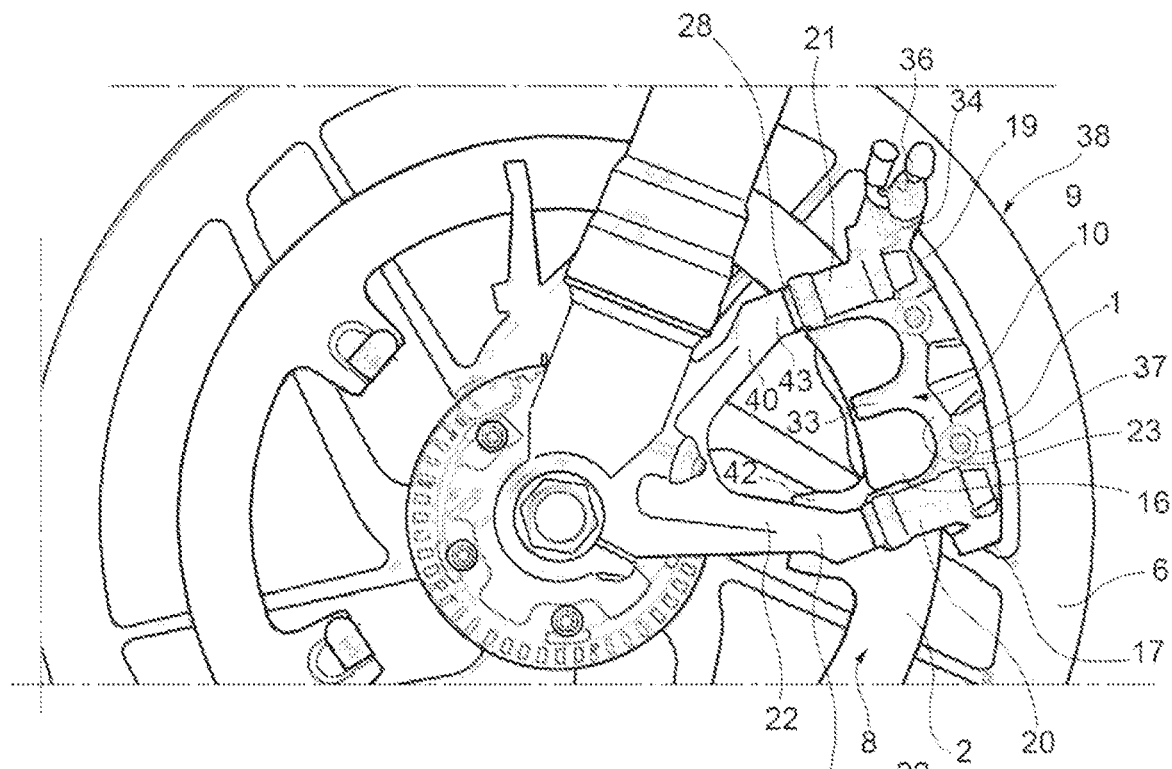
FIG. 3 is a partial front view of the caliper in FIG. 1 mounted astride a floating disc to form a brake disc, wherein the caliper is connected to a support fixed to a wheel hub of a motorcycle.
Figure 4:
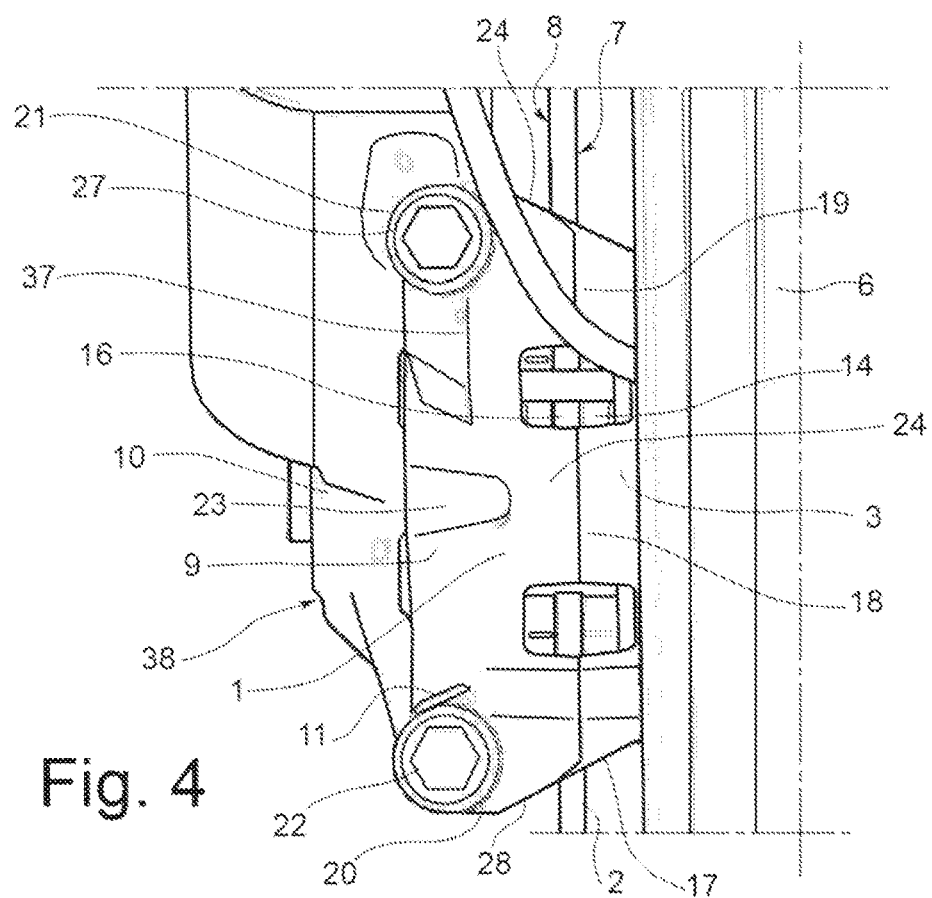
FIG. 4 is a view taken according to the radial direction of a brake mounted on a motor vehicle, according to an embodiment.
Figure 5:
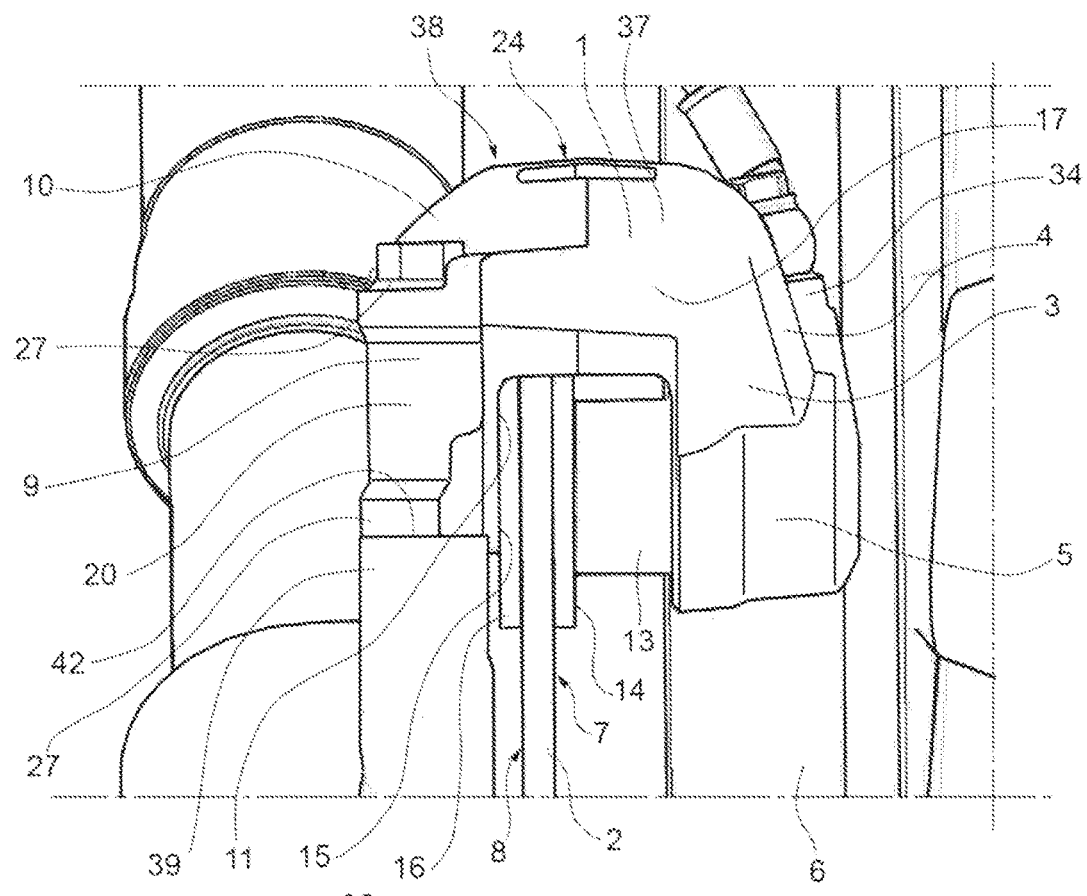
FIG. 5 is a view according to the tangential direction of the brake in FIG. 4, which shows a worn brake pad condition with the thrust devices in extended position.
Figure 6:
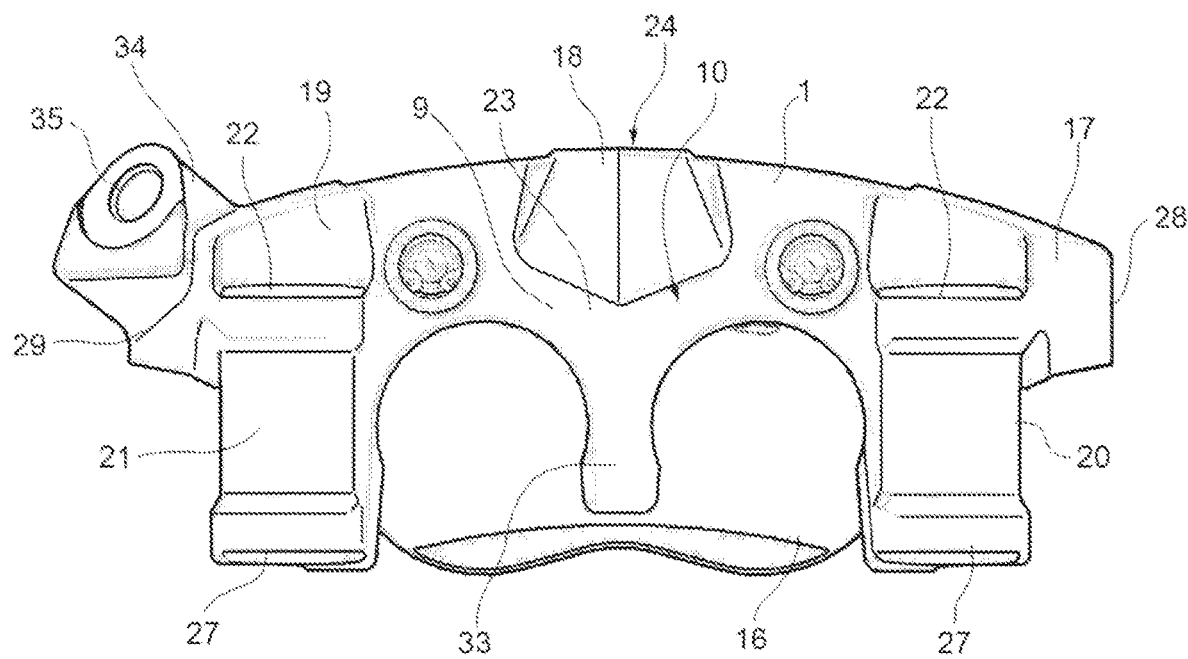
Figure 7:
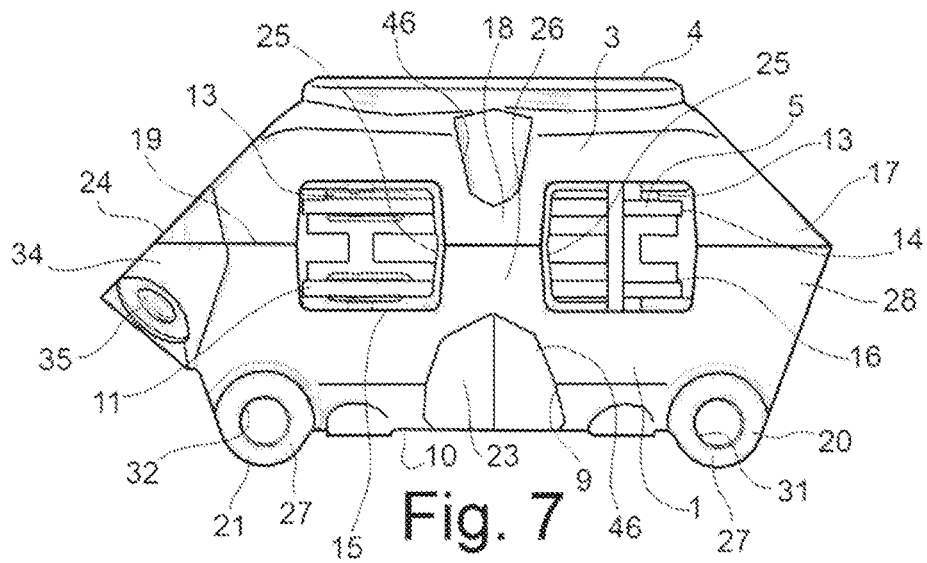
Figure 8:
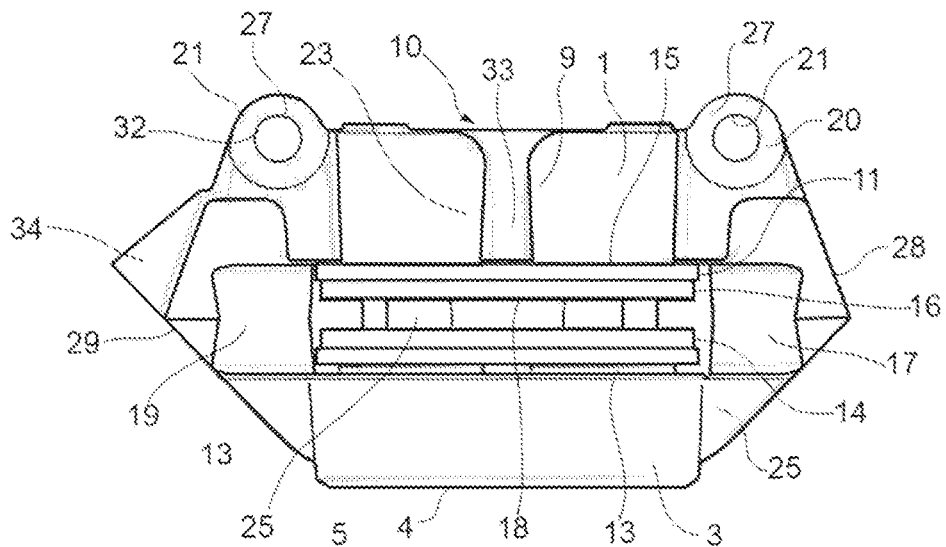
Figure 9:
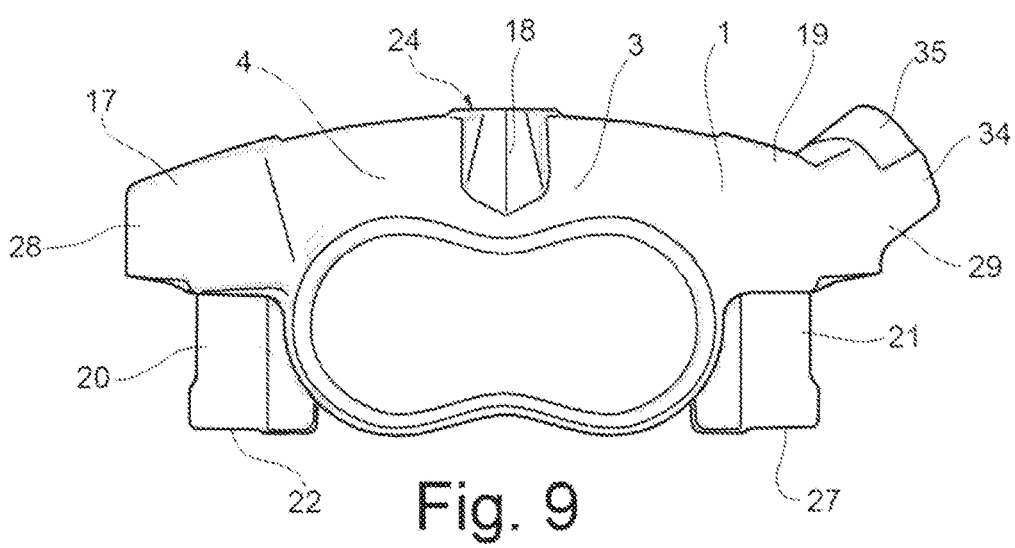
Figure 10:
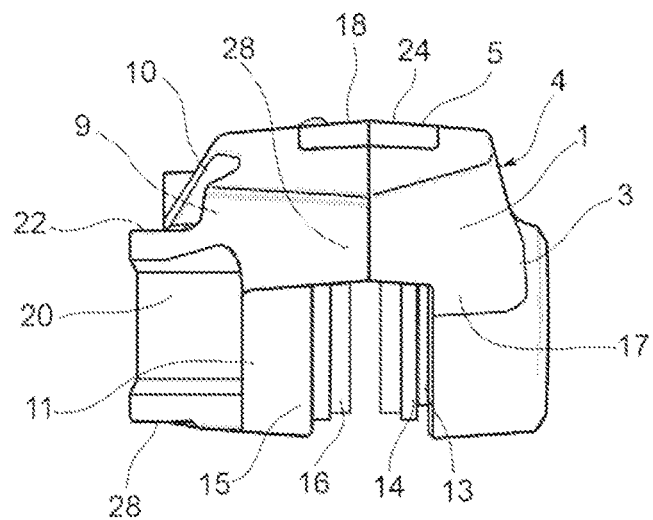
Figure 11:
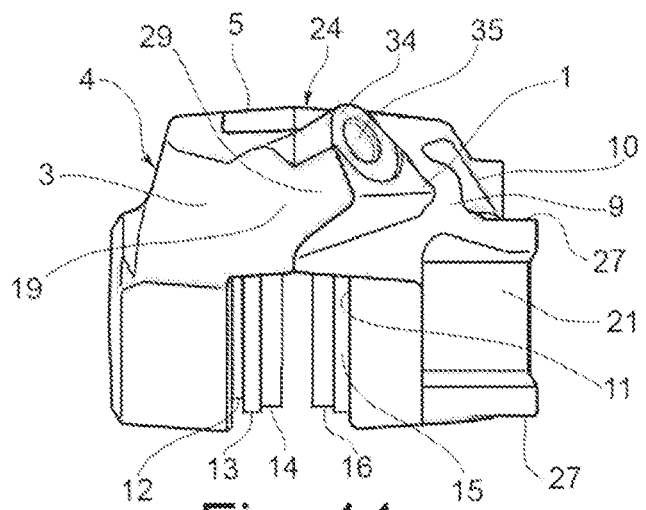
Figure 12:
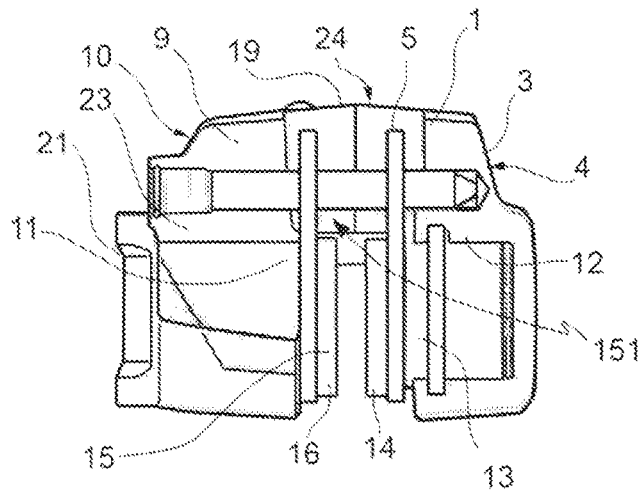
Figure 13:
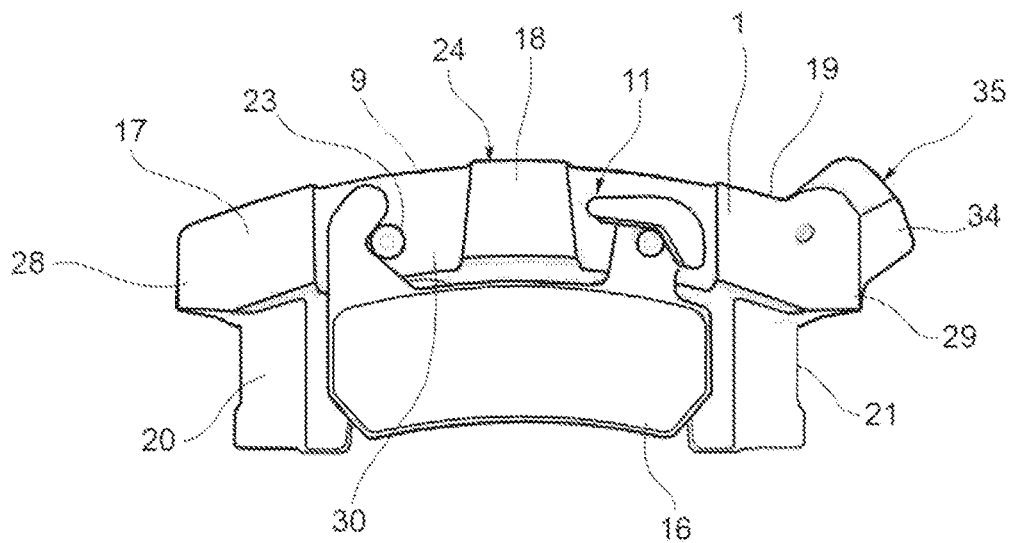
Figure 14:
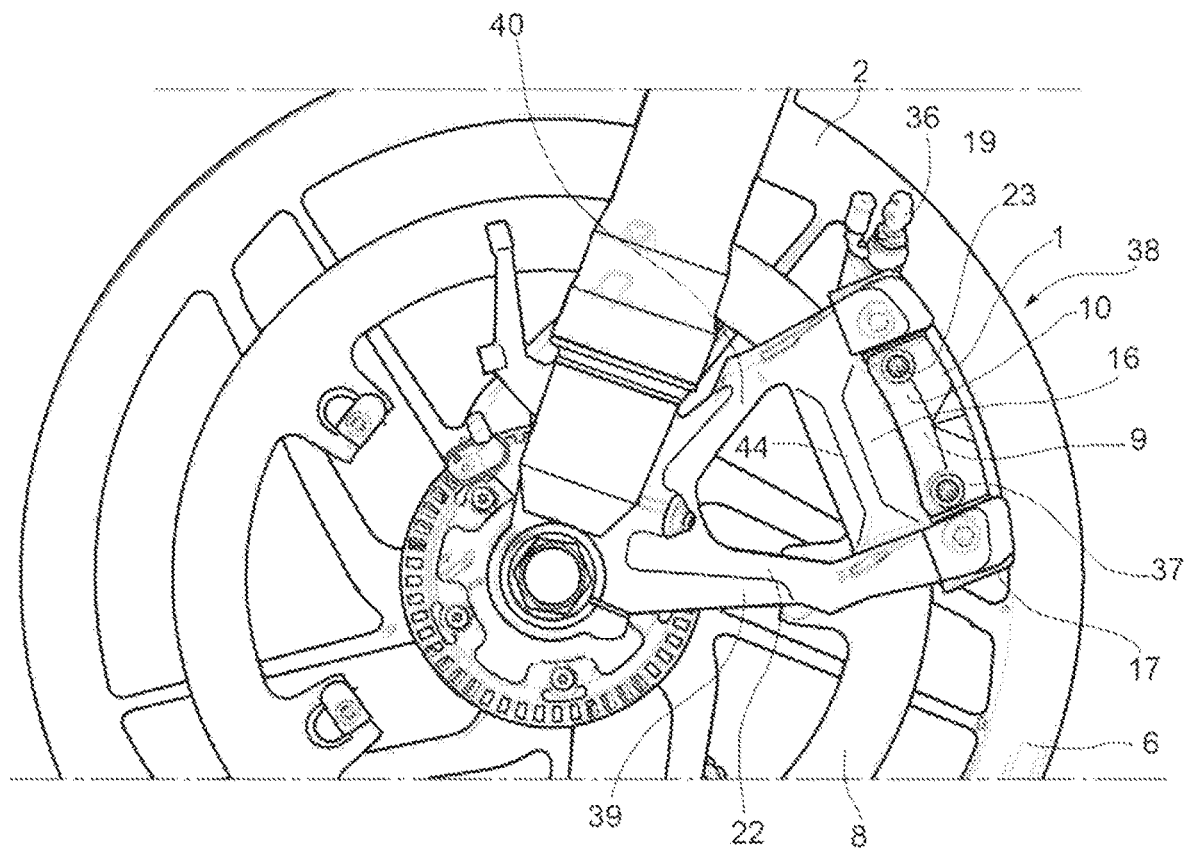
Figure 15:
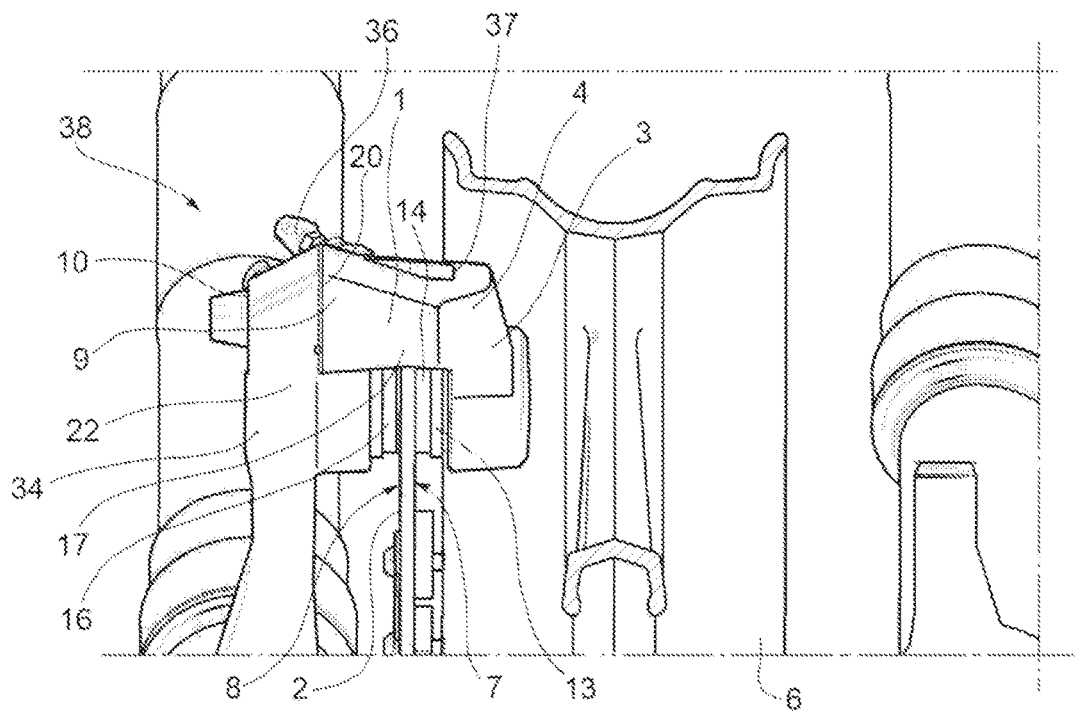
Figure 16:
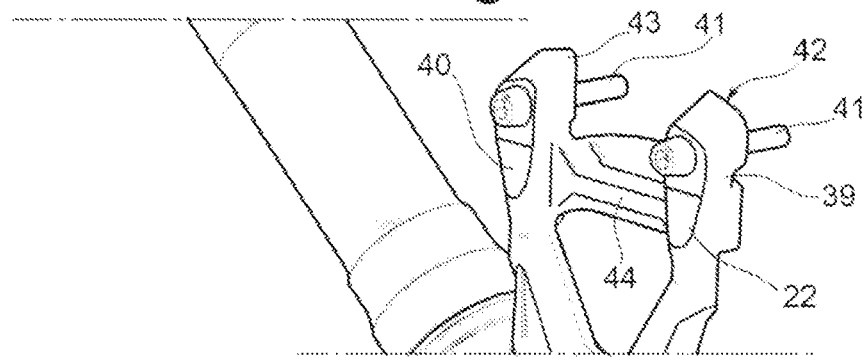
Figure 17:
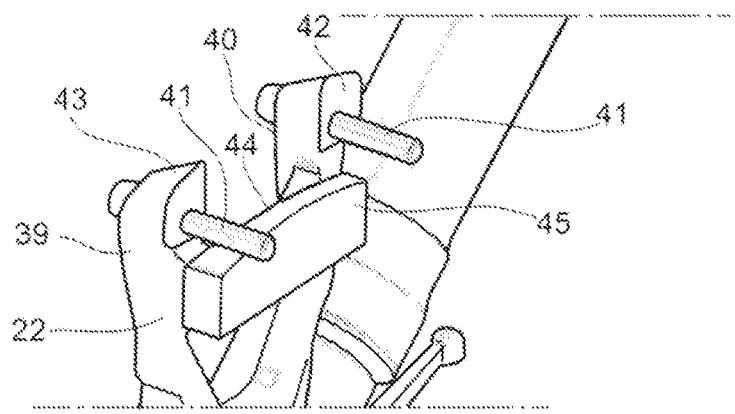
Figure 18:
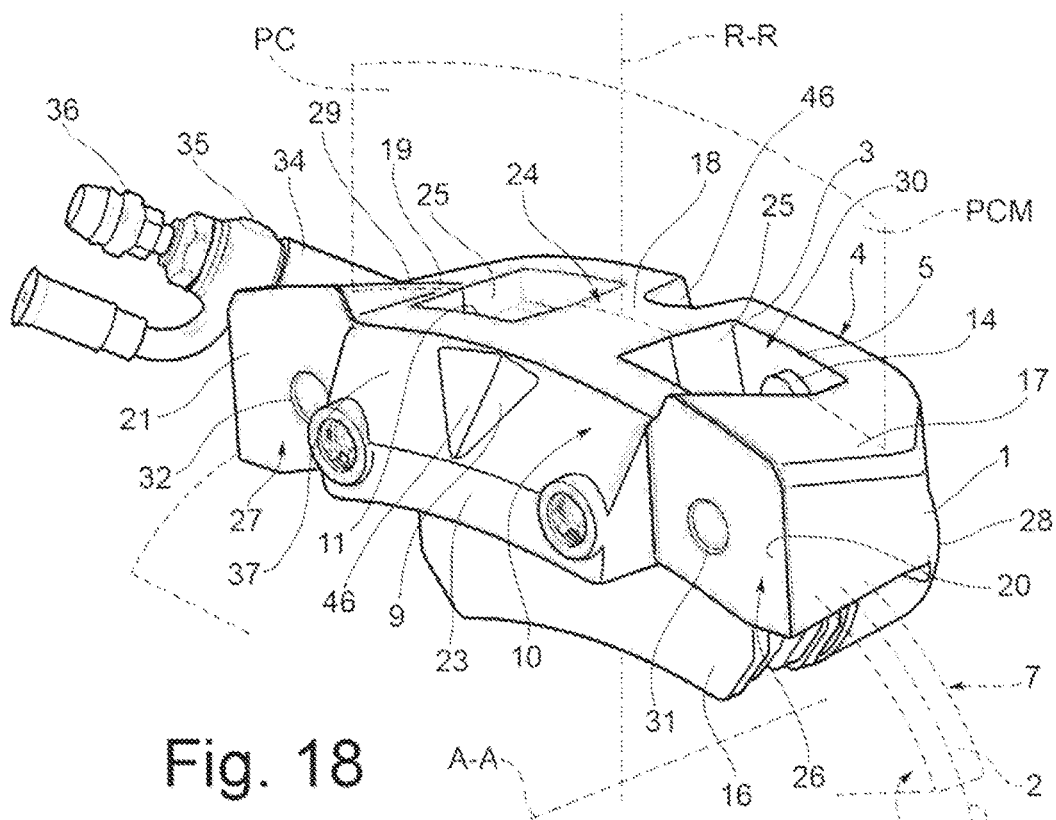
Figure 19:
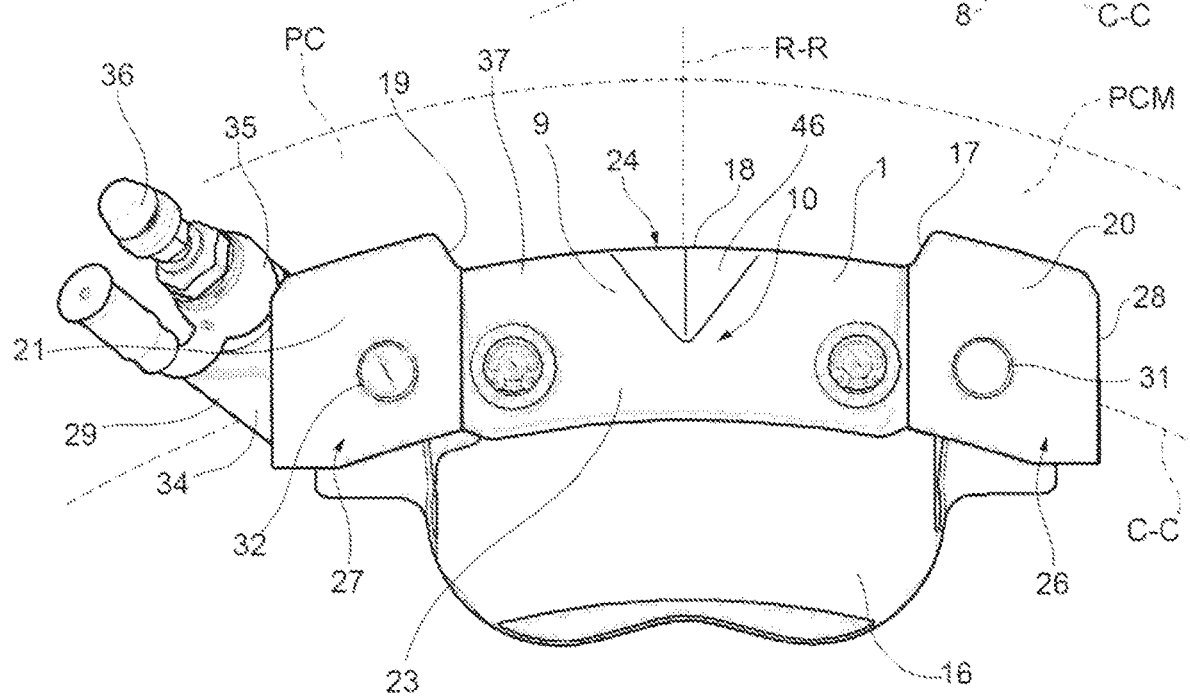
Figure 20:
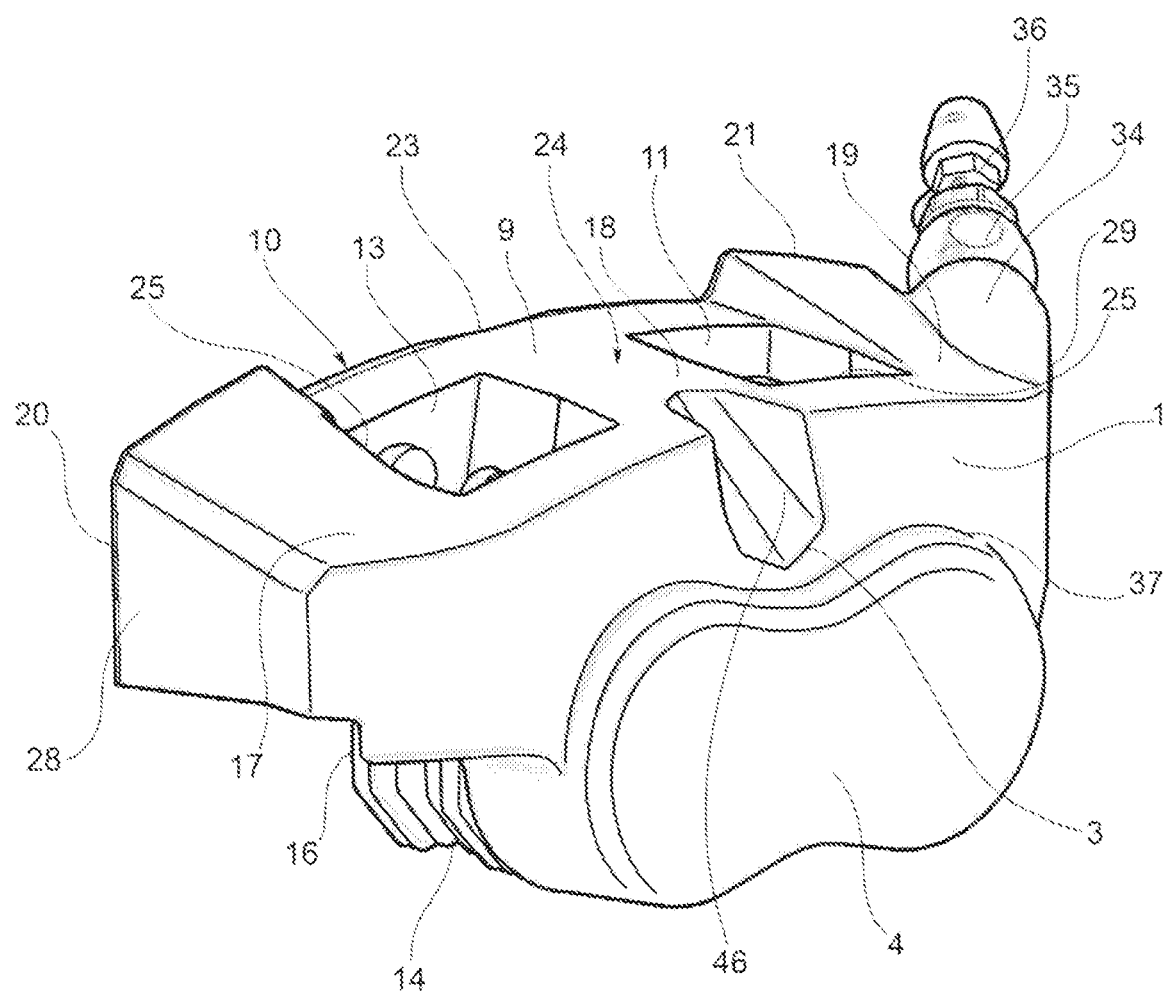
Figure 21:
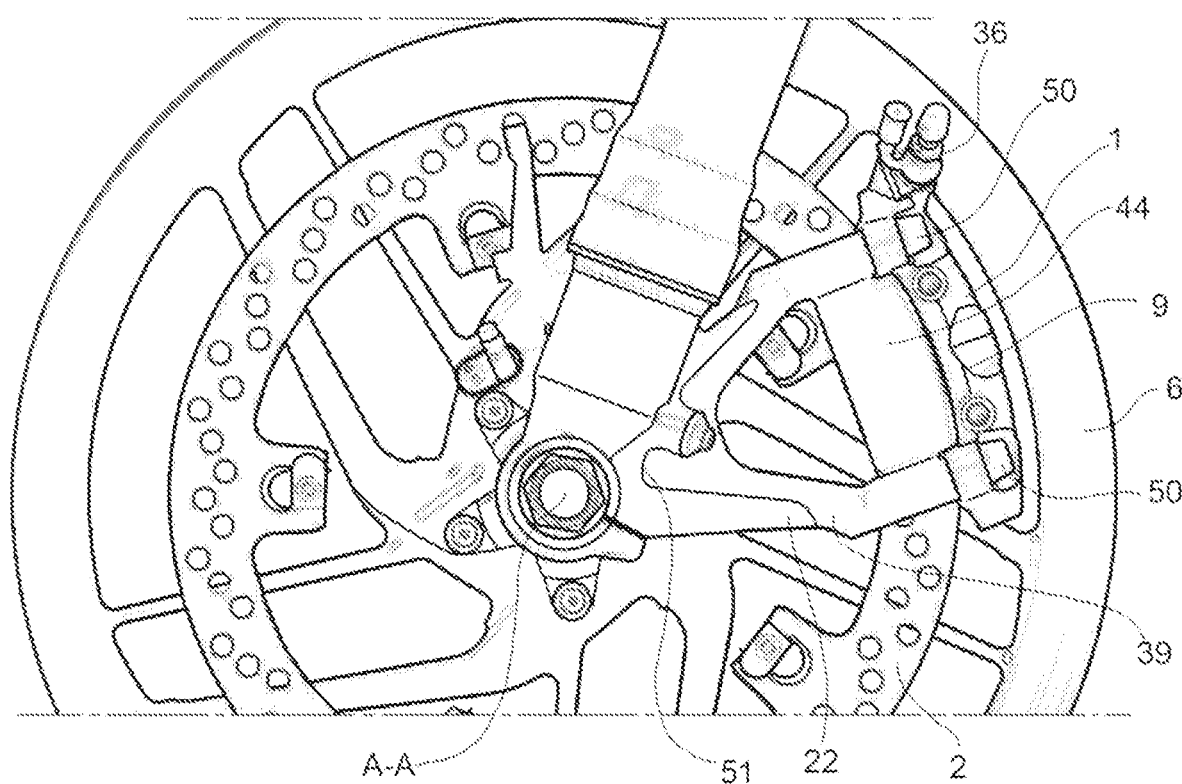
Figure 22:
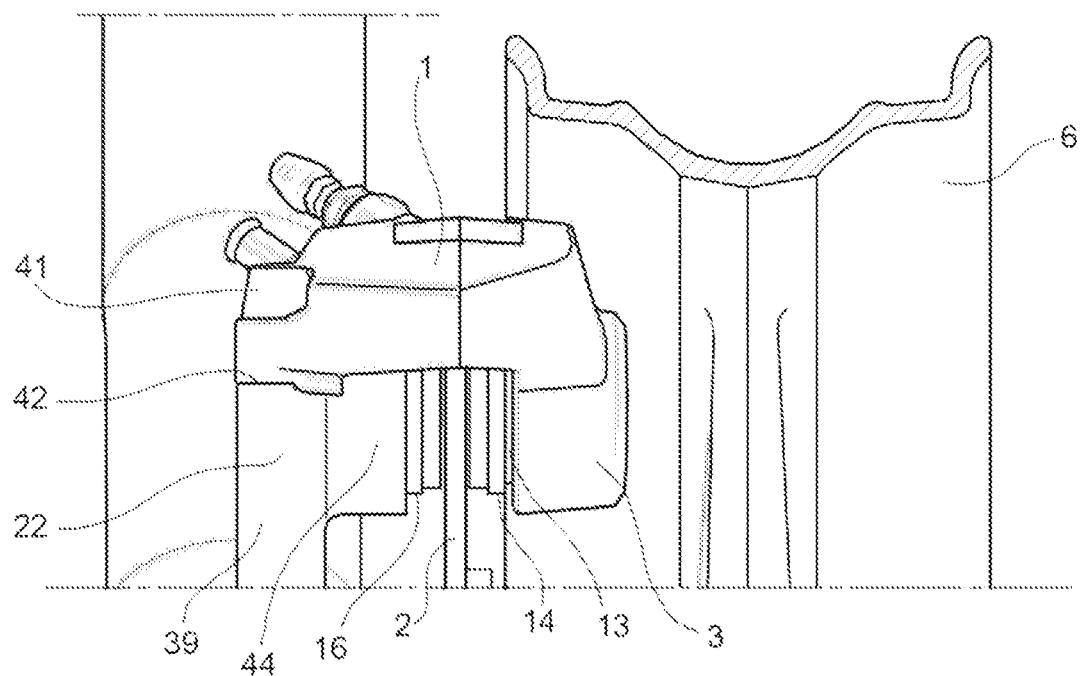
Figure 23:
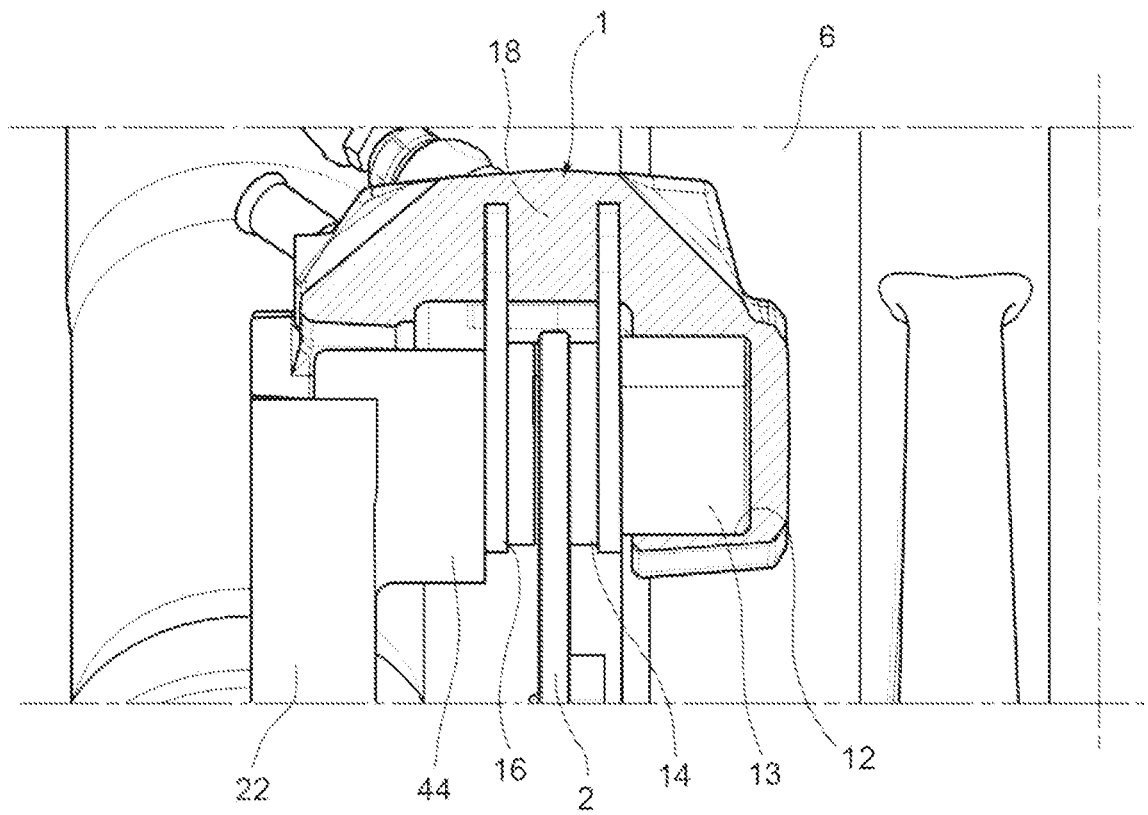
Figure 24:
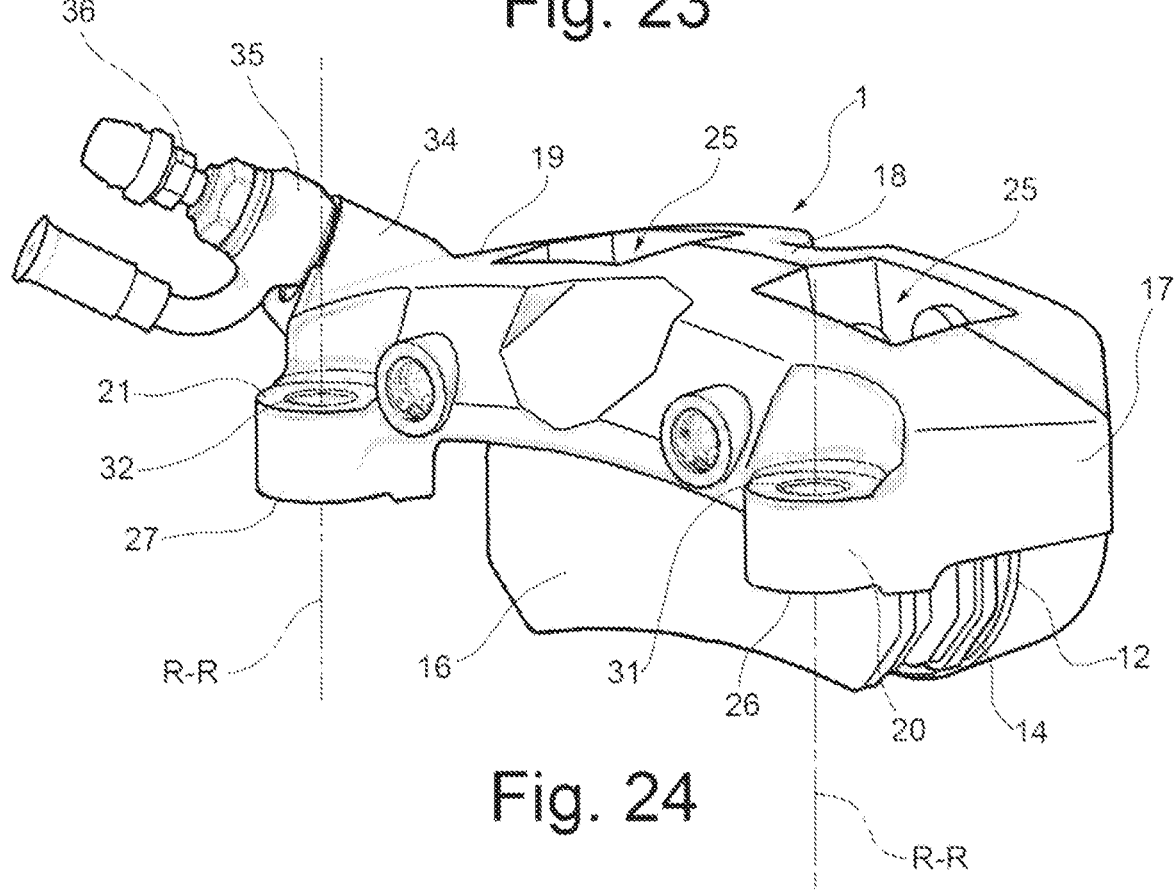
Figure 25:
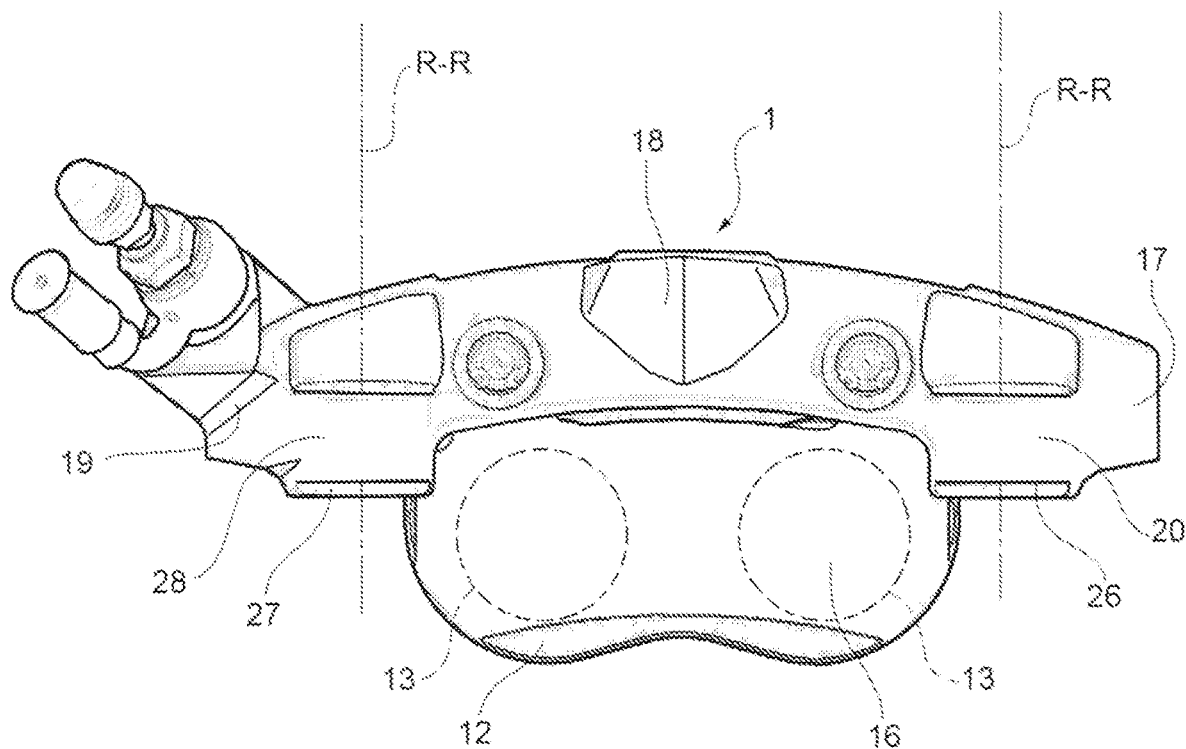
Figure 26:
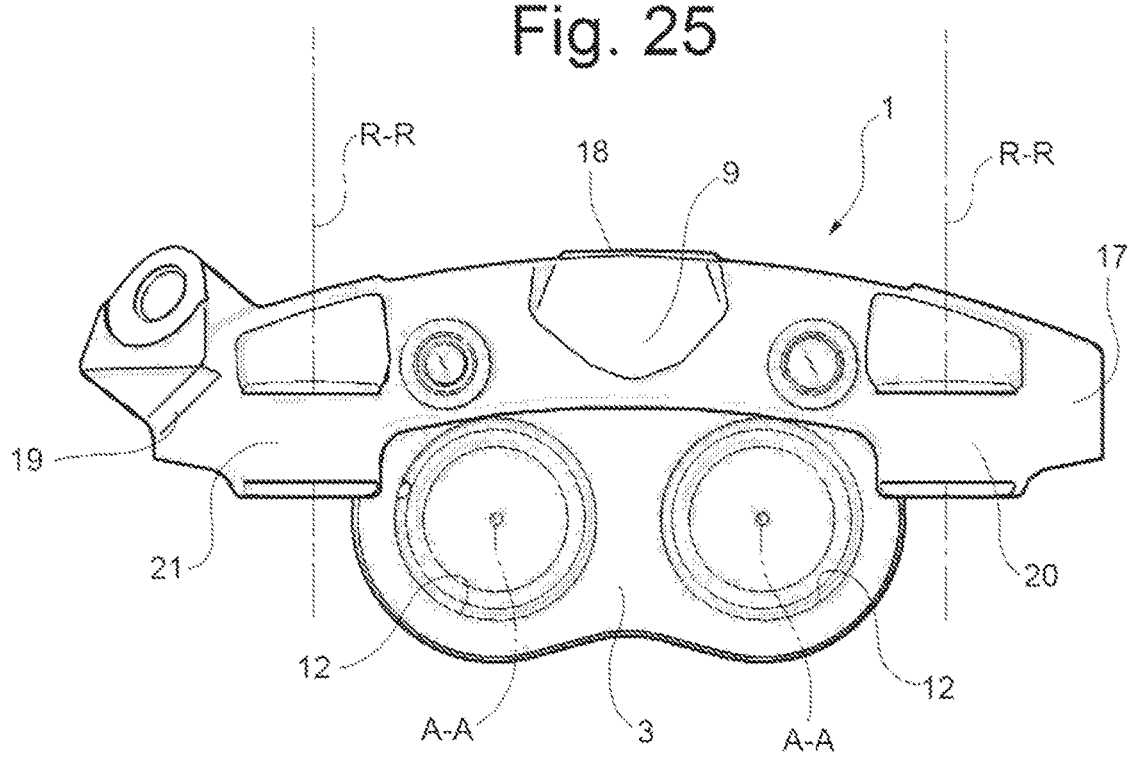
Figure 27:
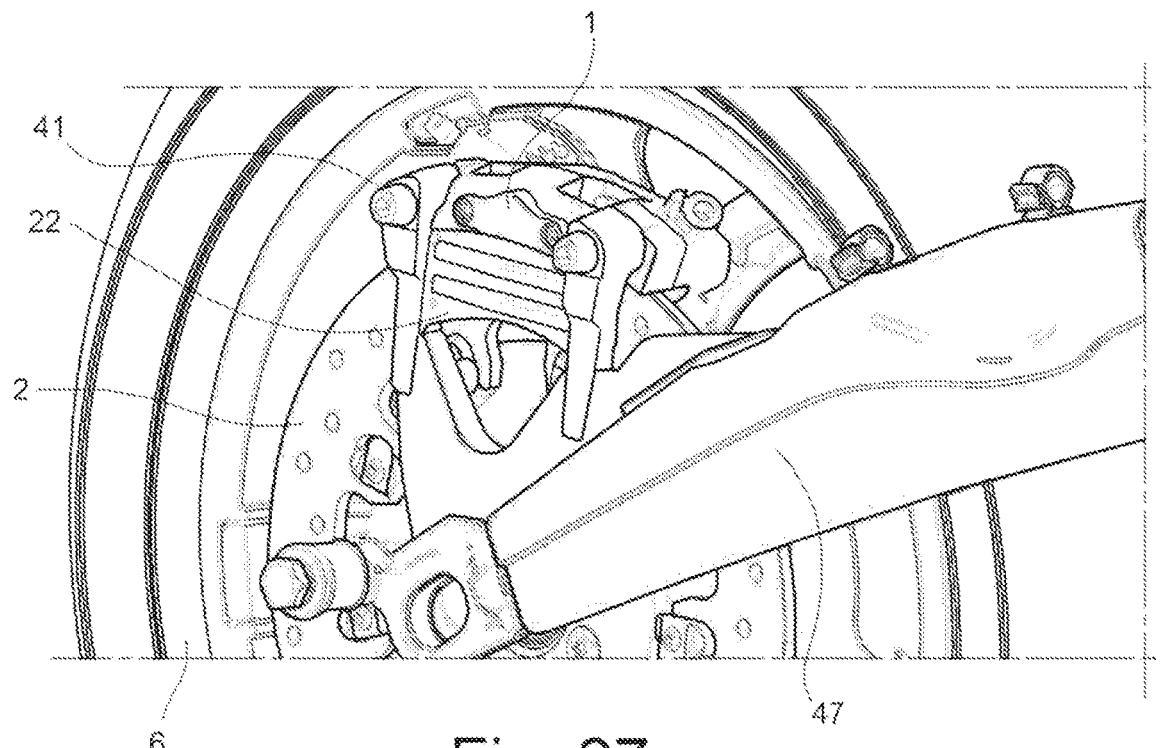
Figure 28:
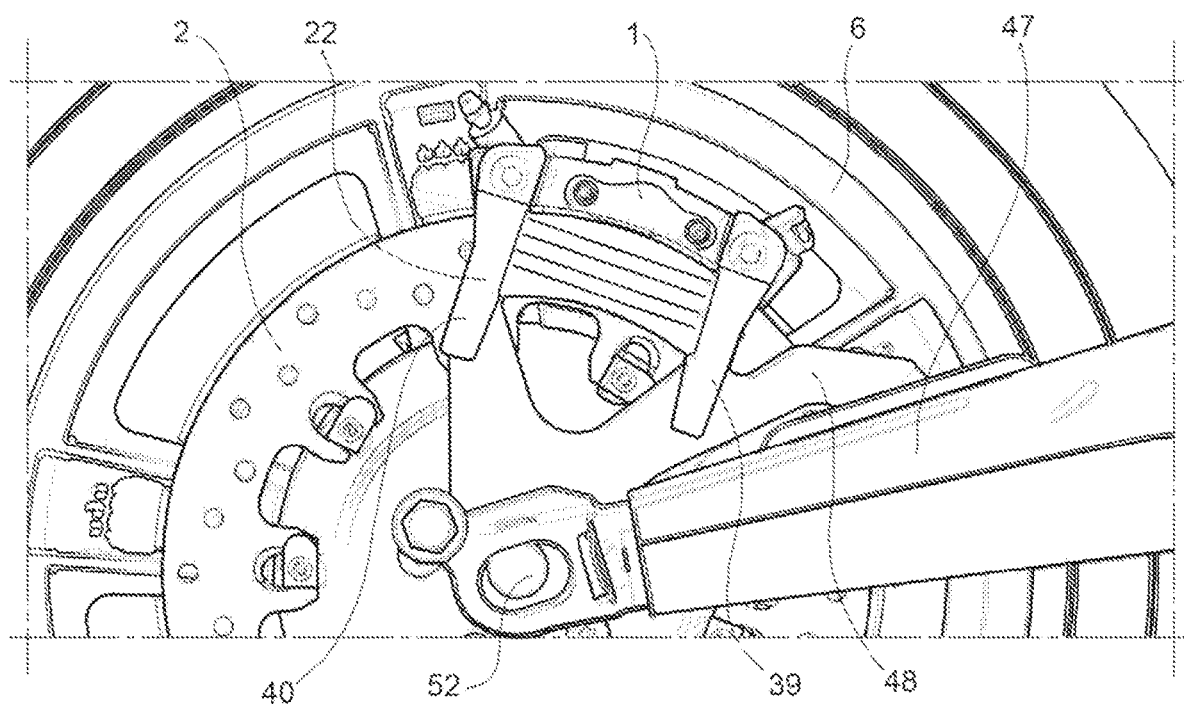
Figure 29:
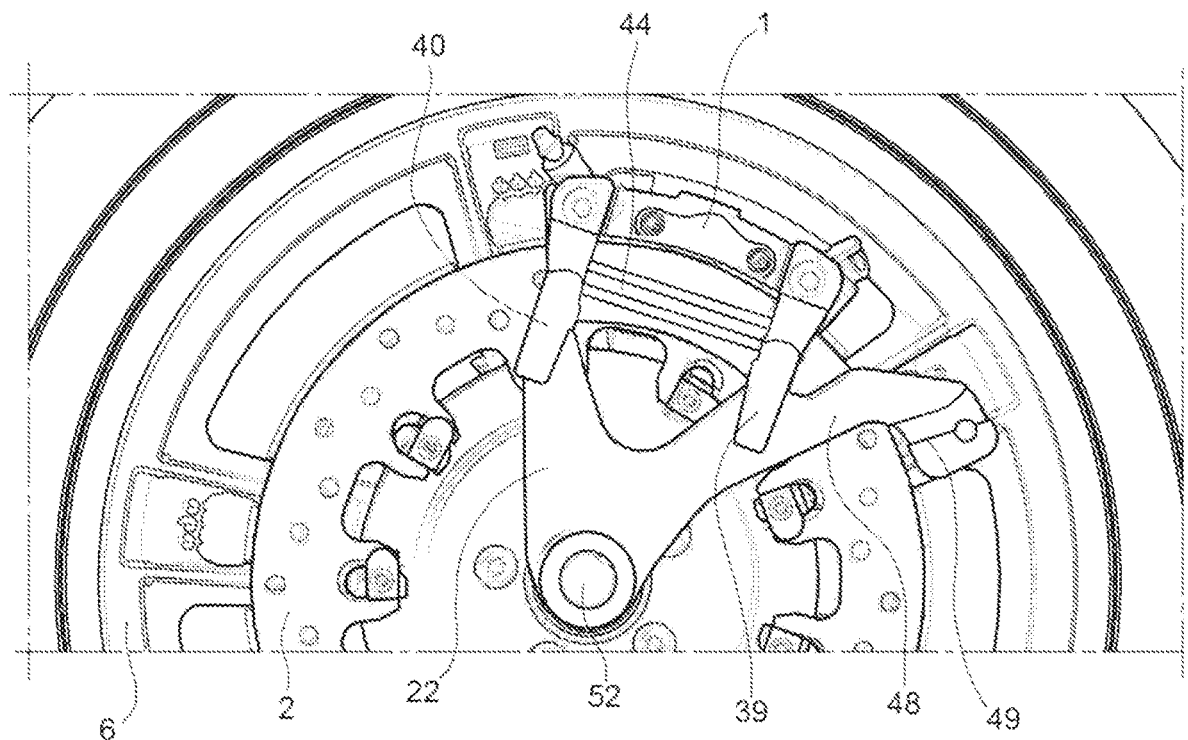
Figure 30:
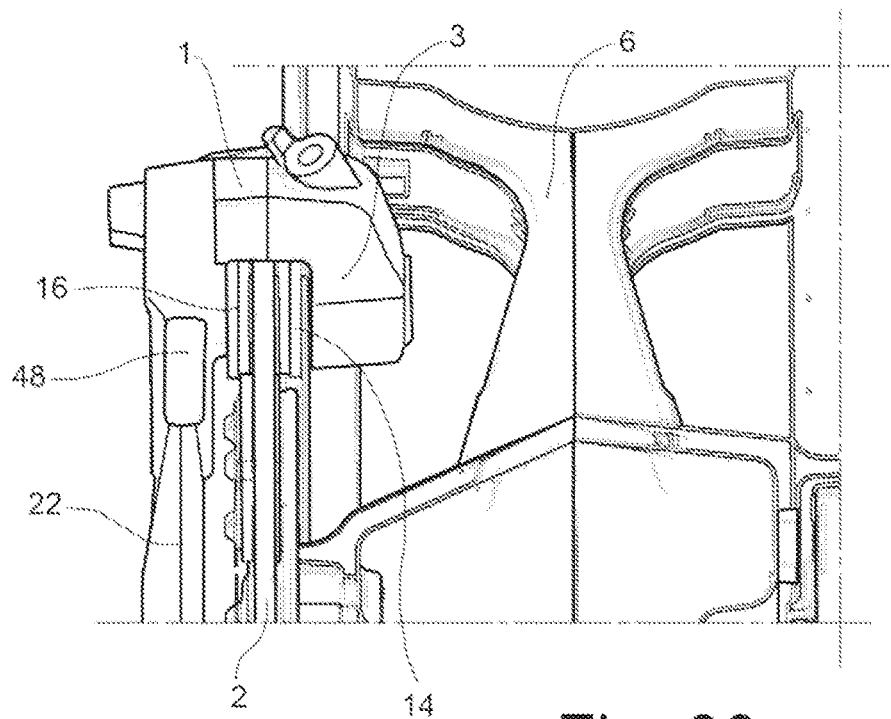
Figure 31:
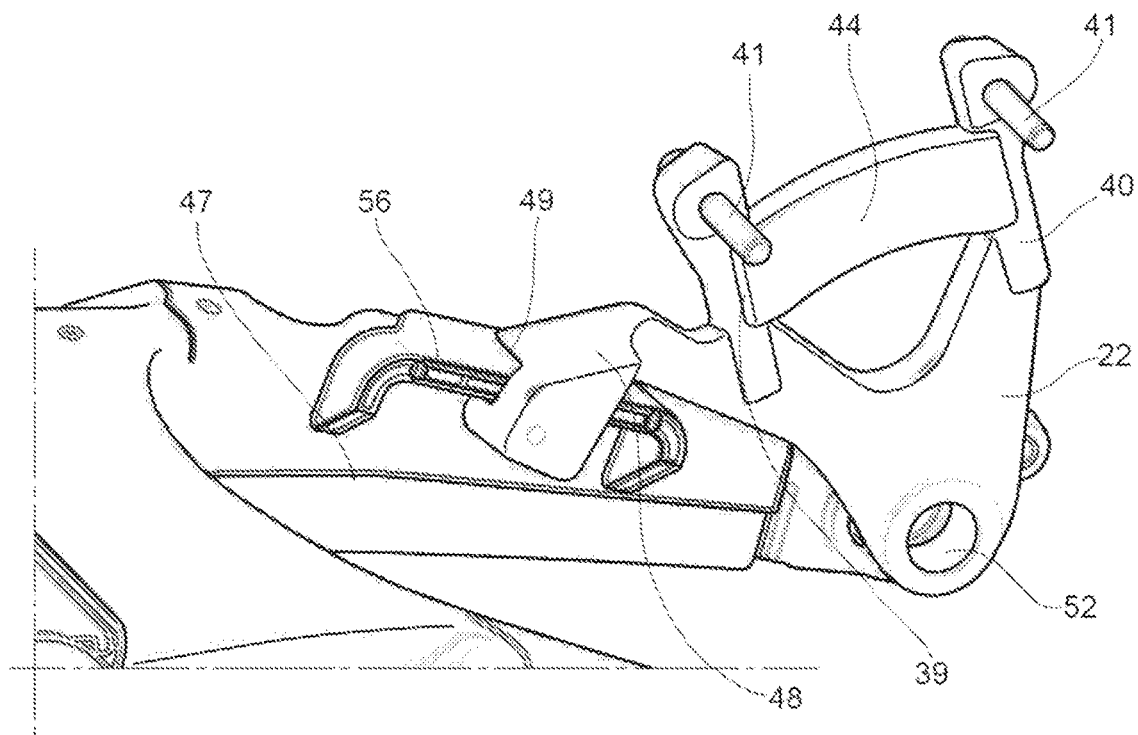
Figure 32:
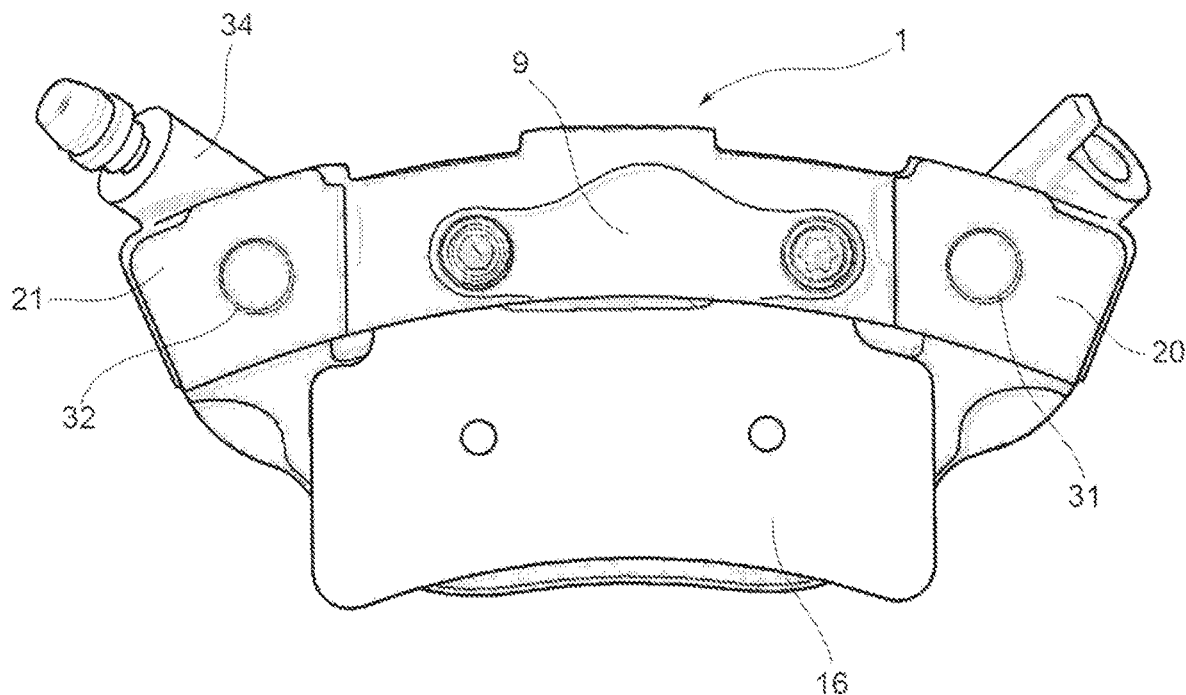

FIGS. from 6 to 11 show the caliper body of the caliper in FIG. 1 according to the orthogonal views;

FIG. 12 shows a section taken along axial planes passing through one of the pad suspension pins and the thrust device axis, here a piston accommodated in a cylinder, of the caliper in FIG. 1;

FIG. 13 shows the caliper body of the caliper in FIG. 1 in section view taken along a median plane of a brake disc associable with the caliper;

FIG. 14 shows a detail of a disc brake mounted on a motor vehicle wheel, wherein the caliper is made according to a further embodiment and has an attachment in its support according to an axial direction;

FIG. 15 shows the brake in FIG. 14 according to a tangential direction;

FIG. 16 shows an axonometric view of a detail of a brake caliper support with axial attachment, as shown in FIG. 14;

FIG. 17 shows an axonometric view of a detail of the support in FIG. 16;

FIGS. from 18 to 20 show axonometric and orthogonal views of a caliper with axial attachments according to FIG. 16;

FIG. 21 shows an axonometric view of a detail of a disc brake mounted on a front wheel of a motor vehicle, wherein the caliper is made according to a further embodiment and has an attachment in its support according to a radial direction;

FIG. 22 shows the brake disc mounted on the wheel of the motor vehicle in FIG. 21, taken along a plane passing through the axial direction;

FIG. 23 shows the brake disc mounted on the wheel of the motor vehicle in FIG. 21, taken along a plane passing through the axial direction passing through the caliper body, also sectioned;

FIG. 24 shows an axonometric view of the brake caliper of the brake in FIG. 21 seen from one side opposed to the wheel;

FIG. 25 shows a front view of the caliper in FIG. 24 taken according to an axial direction;

FIG. 26 shows a front view of the caliper body only of the caliper in FIG. 24 taken according to an axial direction;

FIG. 27 shows an axonometric view of a detail of a disc brake mounted on a rear wheel of a motor vehicle, wherein the caliper is made according to a further embodiment and has an attachment to its support according to an axial direction;

FIG. 28 shows a front view of the detail of the disc brake in FIG. 27;

FIG. 29 shows a front view of the detail of the disc brake in FIG. 27, from which the swingarm has been removed;

FIG. 30 shows a detail of disc brake in FIG. 29;

FIG. 31 shows an axonometric view of the support element of the brake caliper in FIG. 27, associated with a support swingarm of the rear wheel of a motor vehicle;

FIG. 32 shows a front view of the disc brake caliper in FIG. 27.

DESCRIPTION OF SOME PREFERRED EMBODIMENTS

According to a general embodiment, a disc brake caliper body 1 is adapted to be arranged astride a brake disc 2 of floating type.

Said brake disc 2 comprises a first brake disc braking surface 7 and an opposed second brake disc braking surface 8.

Said caliper body 1 comprises a first wheel side elongated element 3. Said first wheel side elongated element 3 comprises a first elongated element caliper outer side 4 and a first elongated element caliper inner side 5. Said first elongated element caliper outer side 4 is adapted to face a wheel of a vehicle 6. At least one portion of the first elongated element caliper inner side 5 is adapted to face, either directly or indirectly, said first brake disc braking surface 7 by means of a first pad 14.

Said caliper body 1 comprises a second elongated element 9 on the side opposed to the wheel. Said second elongated element 9 on the side opposed to the wheel comprises a second elongated element caliper outer side 10 and a second elongated element caliper inner side 5. At least one portion of the second elongated element caliper inner side 11 is adapted to face, either directly or indirectly, said second brake disc braking surface 8 by means of a second opposed pad 16.

Said first wheel side elongated element 3 comprises at least one thrust means seat 12 adapted to receive the thrust means 13 adapted to bias the first pad 14 against said first brake disc braking surface 7.

Said first wheel side elongated element 3 further comprises at least one sliding element 151 adapted to make said first pad 14 slide biased by the thrust means 13 with respect to said caliper body 1.

Said second elongated element 9 on the side opposed to the wheel comprises at least one pad resting surface 15 adapted for the at least partial resting of said second opposed pad 16, preventing this second pad from being biased by any thrust means movable with respect to the caliper body 1 itself.

A "second elongated element on the side opposed to the wheel" means a second element which is adapted to be connected to connecting portions adapted to connect the caliper body to a support element for supporting the caliper, e.g. to a wheel hub, while a "first wheel side elongated element" means a first elongated element as first element opposed to said second element. So, hereinafter either "second elongated element on the side opposed to the wheel" or "elongated element connectible to the support" will be used indifferently and either "first wheel side elongated element" or "elongated element opposed to the support" will be used also indifferently. Indeed, this caliper may be, for example, used on a motor vehicle where the "first wheel side elongated element" is indeed facing the motor vehicle wheel, but also in applications such as, for example, snowmobiles, but not necessarily only these, where the "first wheel side elongated element" is an "elongated element opposed to the support" not facing any wheel of the vehicle, but having the same essential features.

Said pad resting surface 15 lays on a reference plane or "zero" plane, from which reference for the second opposed pad 16 is made, and thus for the brake disc 2 which, pushed by the action of the thrust means 13, always abuts against said second opposed pad 16, which, in turn, abuts against said pad resting surface 15 of the elongated element 9 on the side opposed to the wheel which is connected to its support and thus relatively little or not at all biased by the elastic deformation of the caliper body, thus independently from the elastic deformation or "strain" of the caliper body, allowing a greater braking accuracy by virtue of better forecasting of the behavior of the caliper during braking, forecasting which allows a more accurate compensation of the deformation and the forecasting of the correct position of the brake actuating lever to start the actual braking action of the vehicle.

Said caliper body 1 comprises at least one elongated element connecting bridge 17, 18, 19 adapted to connect said first wheel side elongated element 3 to said elongated element 9 on the side opposed to the wheel, so as to be adapted to be arranged astride said brake disc 2.

Advantageously, said second elongated element 9 on the side opposed to the wheel comprises at least two portions, each defining a connecting seat 20, 21 adapted to connect the caliper body 1 to a support element 22 for supporting the caliper to a wheel hub.

Further advantageously, said second elongated element 9 on the side opposed to the wheel comprises at least one connecting portion of second elongated element on the side opposed to the wheel 23, which mutually connects said at least two portions each defining a connecting seat 20, 21.

More advantageously, said connecting portion of second elongated element on the side opposed to the wheel 23 is adapted to face at least one portion of said second pad 16.

According to an alternative embodiment, said connecting portion of second elongated element on the side opposed to the wheel 23 is integral or in one piece with said at least two portions, each defining a connecting seat 20, 21.

According to an alternative embodiment, a first disc inlet end bridge 17 and a second disc outlet end bridge 19 and said at least two portions each defining a connecting seat 20, 21 are provided at said first and second end bridge 17, 19.

According to an alternative embodiment, said first and second end bridge 17, 19 extend astride the disc brake 2 according to an axial direction A-A substantially parallel to the rotational axis of the brake disc, and said connecting seats 20, 21 are aligned with said end bridges 17, 19 and extend according to an axial direction A-A.

According to an alternative embodiment, said at least two portions each defining a connecting seat 20, 21 form at least two connecting resting planes 26, 27, e.g. planes parallel to a plane which extends according to a radial direction R-R, transversal to the rotational axis of the disc A-A.

According to an alternative embodiment, said connecting seats 20, 21 are aligned with said end bridges 17, 19, and extend according to a direction either radial R-R or parallel to a radial axis or parallel to each other.

According to an alternative embodiment, said at least two portions each defining a connecting seat 20, 21 form at least two connecting resting planes 26, 27, e.g. directed according to a plane which extends according to an axial direction A-A, or passing through an axis parallel to the rotational axis of the disc A-A and orthogonal to a radial axis R-R passing through the centerline of the caliper body 1, or radial center plane PRM-PRM of the caliper.

According to an alternative embodiment, said end bridges 17, 19 have an end bridge outer side 28, 29 facing in circumferential direction C-C to the outside of the caliper body 1. Said outer side 28, 29 is circumferentially tapered away from the radial center plane PRM-PRM of the caliper.

According to an alternative embodiment, said at least one central bridge 18 has a central bridge outer side 24 which faces outside the caliper body. Said central bridge outer side 24 is radially tapered away from the caliper body.

According to an alternative embodiment, said central bridge outer side 24 has at least one central bridge groove 46 extending along at least one stretch of said central bridge 18.

According to an alternative embodiment, said at least one central bridge groove 46 is constituted by two central bridge grooves 46 arranged on sloping surfaces of the tapered side of central bridge 24.

According to an alternative embodiment, said central bridge 18 and said end bridges 17, 19 are mutually distanced in circumferential direction C-C forming at least one weight reduction and heat discharge window 25, 30.

According to an alternative embodiment, said central bridge 18 and said end bridges 17, 19 are mutually distanced in circumferential direction C-C forming at least two weight reduction and heat discharge window 25, 30.

According to an alternative embodiment, said connecting seats 31, 32 delimited by said portions defining a connecting seat 20, 21 are aligned with said connecting portion of second elongated element on the side opposed to the wheel 23.

According to an alternative embodiment, said connecting portion of second elongated element on the side opposed to the wheel 23 forms a rest for said second opposed pad 16.

According to an alternative embodiment, at least one finger-like portion 33 projects radially from said connecting portion of second elongated element on the side opposed to the wheel 23 as a rest for a second opposed pad portion 16.

According to an alternative embodiment, said caliper body 1 is made in one piece.

According to an alternative embodiment, said caliper body comprises at least two parts which are firmly connected to each other. According to an alternative embodiment, said caliper body comprises at least two parts firmly connected to each other, a first one comprising the first wheel side elongated element 3 and at least one portion of the at least one elongated element connecting bridge 17; 18; 19, a second one comprising the second elongated element 9 on the side opposed to the wheel and at least the remaining portion of the at least one elongated element connecting bridge 17; 18; 19.

According to an alternative embodiment, said brake disc 2 on which the caliper body is arranged astride, comprises a brake disc center plane, or circumferential plane PC-PC, either parallel to or coinciding with the plane PCM-PCM, as well as transversal to the rotational axis of the brake disc 2 and passing through its centerline. A supply pipe 34 of the control or brake fluid to the thrust means 13 extends from said thrust means 13 to a pipe inlet 35 arranged in a portion of the caliper body 1 placed in the centerline of the caliper body opposed to the wheel with respect to the circumferential plane PC-PC.

According to an alternative embodiment, said supply pipe 34 is obtained at least partially in the caliper body 1.

According to an alternative embodiment, said pipe inlet 35 substantially faces the side opposed to the wheel.

According to an alternative embodiment, said pipe inlet 35 is arranged near one of the portions defining a connecting seat 20, 21.

According to an alternative embodiment, a purge valve 36 and a control or brake fluid feeding inlet connector 37 are associated with the single pipe inlet 35.

The present invention further relates to a brake caliper 37 comprising at least one caliper body 1 as defined in any one of the embodiments described above.

The present invention further relates to a brake caliper support element 22 adapted to support a brake caliper 37 comprising a caliper body 1 as defined in any one of the embodiments described above, wherein said support element 22 comprises at least two tines 39, 40, each comprising an element 41 for the connection to the caliper body, e.g. studs adapted to be firmly screwed into said connecting seats 31, 32.

According to an alternative embodiment, resting counter-surfaces 42, 43 are provided near each element 41 for the connection to the caliper body, adapted to couple to said connecting seats 31, 32 of the caliper body 1 for a stable and rigid connection between the support element 22 and the caliper body 1.

According to an alternative embodiment, said resting counter-surfaces 42, 43 are arranged on a plane substantially orthogonal to the axial direction A-A.

According to an alternative embodiment, said resting counter-surfaces 42, 43 are arranged on a plane which is substantially orthogonal to a radial direction R-R or a direction parallel to a radial direction R-R passing through the rotational axis of the brake disc 2.

According to an alternative embodiment, a stiffening support element 44 connects the two support element tines 39, 40.

According to an alternative embodiment, the stiffening support element 44 comprises a stiffening element resting surface 45 for resting and supporting said second pad 16.

The present invention further relates to a disc brake 38 comprising a caliper 37 according to anyone of the embodiments above defined.

The present invention further relates to a disc brake 38 comprising a caliper 37 as defined above and a support element as defined in one of the embodiments defined above.

The present invention further relates to a motor vehicle comprising a disc brake 38 as previously defined.

Hereinafter, a brake caliper support element 22 adapted to support a brake caliper 37 comprising a caliper body 1 is described.

Said support element 22 comprises at least two tines 39, 40, each comprising an element 41 for the connection to the caliper body. Resting counter-surfaces 42, 43 are provided near each element 41 for the connection to the caliper body and are adapted to couple to connecting seats 31, 32 of the caliper body 1 for a stable and rigid connection between the support element 22 and the caliper body 1.

Advantageously, a stiffening support element 44 connects the two support element tines 39, 40.

Further advantageously, the stiffening support element 44 comprises a stiffening element resting surface 45 for resting and supporting said second pad 16.

According to an alternative embodiment, the stiffening and support element 44 comprises a stiffening element resting surface 45 for resting and supporting said second pad 16 which, in operating conditions, abuts directly against said stiffening element resting surface 45.

According to an alternative embodiment, said stiffening and support element 44 structurally integrates with the caliper body 1, although remaining partially separate, to form a second elongated element 9 on the side opposed to the wheel, so as to form a structural completion of the caliper body 1 itself.

According to an advantageous embodiment, not necessarily to be provided together with the embodiments described above, said resting counter-surfaces 42, 43 are arranged on a plane substantially orthogonal to the axial direction A-A.

According to an advantageous embodiment, not necessarily to be provided together with the embodiments described above, said resting counter-surfaces 42, 43 are arranged on a plane which is substantially orthogonal to a radial direction R-R or a direction parallel to a radial direction R-R passing through the rotational axis of the brake disc 2.

According to an advantageous embodiment, not necessarily to be provided together with the embodiments described above, said tines 39, 40 converge away from said connecting elements to the caliper body 41.

According to an advantageous embodiment, not necessarily to be provided together with the embodiments described above, each of said caliper body connecting elements 41 comprises at least one connecting element seat 49 to receive fixing elements 50, such as studs, in order to firmly connect the caliper body 1 to said support element 22.

According to an advantageous embodiment, not necessarily to be provided together with the embodiments described above, said support element 22 is in one piece with the motor vehicle front fork hub 51.

According to an advantageous embodiment, not necessarily to be provided together with the embodiments described above, wheel axle seat 52 is provided in said support element 22.

According to an advantageous embodiment, not necessarily to be provided together with the embodiments described above, a further support element arm 48 is provided in said support element 22 for anchoring a motorcycle swingarm 47.

According to an advantageous embodiment, not necessarily to be provided together with the embodiments described above, a further arm hooking portion 49 is provided at the free end of said further arm 48 for firmly coupling the support element to the swingarm 47.

A further embodiment of a caliper body will be described below.

Said disc brake caliper body is adapted to be arranged astride a brake disc 2 of floating type. Said brake disc 2 comprises a first brake disc braking surface 7 and an opposed second brake disc braking surface 8.

Said caliper body comprises a first wheel side elongated element 3, having a first elongated element caliper outer side 4 and a first elongated element caliper inner side 5.

Said first elongated element caliper outer side 4 is adapted to face a wheel of a vehicle 6. At least one portion of the first elongated element caliper inner side 5 is adapted to face, either directly or indirectly by means of a first pad 14, said first brake disc braking surface 7.

Said caliper body comprises a second elongated element 9 on the side opposed to the wheel having a second elongated element caliper outer side 10 and a second elongated element caliper inner side 5.

At least one portion of the second elongated element caliper inner side 11 is adapted to face, either directly or indirectly by means of a second opposed pad 16, said second brake disc braking surface 8.

Said first wheel side elongated element 3 comprises at least one thrust means seat 12 adapted to receive the thrust means 13 adapted to bias the first pad 14 against said first brake disc braking surface 7.

Said second elongated element 9 on the side opposed to the wheel comprises at least one pad resting surface 15 adapted for the at least partial resting of said second opposed pad 16, preventing this second pad from being biased by any thrust means movable with respect to the caliper body 1 itself.

Said caliper body 1 comprises at least one elongated element connection bridge 17, 18, 19 adapted to connect said first wheel side elongated element 3 to said second elongated element 9 on the side opposed to the wheel, so as to be adapted to be arranged astride said brake disc 2.

According to an advantageous embodiment, not necessarily to be provided together with the embodiments described above, at least said second elongated element 9 on the side opposed to the wheel comprises at least two portions, each defining a connecting seat 20, 21 adapted to connect the caliper body 1 to a support element 22 for supporting the caliper to the vehicle.

According to an advantageous embodiment, not necessarily to be provided together with the embodiments described above, said at least one thrust means seat 12 faces freely in axial direction A-A so that said at least one thrust means seat 12 is entirely accessible along rectilinear directions parallel to the axial direction A-A, avoiding to interfere with said caliper body 1.

According to an advantageous embodiment, not necessarily to be provided together with the embodiments described above, said second elongated element 9 on the side opposed to the wheel comprises at least one connecting portion of second elongated element on the side opposed to the wheel 23 which mutually connects said at least two portions each defining a connecting seat 20, 21.

According to an advantageous embodiment, not necessarily to be provided together with the embodiments described above, said connecting portion of second elongated element on the side opposed to the wheel 23 is adapted to face at least one portion of said second pad 16.

According to an alternative embodiment, not necessarily to be provided together with the embodiments described above, said connecting portion of second elongated element on the side opposed to the wheel 23 is integral or in one piece with said at least two portions, each defining a connecting seat 20, 21.

According to an advantageous embodiment, not necessarily to be provided together with the embodiments described above, said connecting seat 20, 21 is adapted to connect the caliper body 1 to a support element 22 to support the caliper to a wheel hub or wheel pin or swingarm 47.

According to an advantageous embodiment, not necessarily to be provided together with the embodiments described above, a first disc inlet end bridge 17 and a second disc outlet end bridge are provided, and wherein said at least two portions each defining a connecting seat 20, 21 are provided at said first and second end bridge 17, 19.

According to an advantageous embodiment, not necessarily to be provided together with the embodiments described above, said first and second end bridge 17, 19 extend so as to be arranged astride the brake disc 2 according to an axial direction A-A substantially parallel to the rotational axis of the brake disc.

According to an advantageous embodiment, not necessarily to be provided together with the embodiments described above, said connecting seats 20, 21 are aligned with said end bridges 17, 19, and extend according to an axial direction A-A.

According to an advantageous embodiment, not necessarily to be provided together with the embodiments described above, said at least two portions each defining a connecting seat 20, 21 form at least two connecting resting planes 26, 27, e.g. directed according to a plane which extends according to a radial direction R-R, transversal to the rotational axis of the disc A-A.

According to an advantageous embodiment, not necessarily to be provided together with the embodiments described above, said connecting seats 20, 21 are aligned with said end bridges 17, 19, and extend according to a direction either radial R-R or parallel to a radial axis or parallel to each other.

According to an advantageous embodiment, not necessarily to be provided together with the embodiments described above, said at least two portions each defining a connecting seat 20, 21 form at least two connecting resting planes 26, 27, e.g. directed according to a plane which extends according to an axial direction A-A, or passing through an axis parallel to the rotational axis of the disc A-A and orthogonal to a radial axis passing through the centerline of the caliper body 1, or radial center plane PRM-PRM of the caliper.

According to an advantageous embodiment, not necessarily to be provided together with the embodiments described above, said end bridges 17, 19 have an end bridge outer side 28, 29 facing in circumferential direction C-C outside the caliper body 1, and wherein said outer side 28, 29 is circumferentially tapered away from the radial center plane PRM-PRM of the caliper.

According to an advantageous embodiment, not necessarily to be provided together with the embodiments described above, said at least one central bridge 18 has a central bridge outer side 24, which externally faces the caliper body, and wherein said central bridge outer side 24 radially tapers moving radially away from the caliper body.

According to an advantageous embodiment, not necessarily to be provided together with the embodiments described above, said central bridge outer side 24 has at least one central bridge groove 46 extending along a stretch of said central bridge 18.

According to an advantageous embodiment, not necessarily to be provided together with the embodiments described above, said at least one central bridge groove 46 are two central bridge grooves arranged on sloping surfaces of the tapered side of central bridge 24.

According to an advantageous embodiment, not necessarily to be provided together with the embodiments described above, said central bridge 18 and said end bridges 17, 19 are mutually distanced in circumferential direction C-C forming at least two weight reduction and heat discharge window 25, 30.

According to an alternative embodiment, not necessarily to be provided together with the embodiments described above, said connecting seats 31, 32 delimited by said portions defining a connecting seat 20, 21 are aligned with said connecting portion of second elongated element on the side opposed to the wheel 23.

According to an advantageous embodiment, not necessarily to be provided together with the embodiments described above, said connecting portion of second elongated element on the side opposed to the wheel 23 forms a rest for said second opposed pad 16.

According to an advantageous embodiment, not necessarily to be provided together with the embodiments described above, said caliper body 1 is in one piece.

According to an advantageous embodiment, not necessarily to be provided together with the embodiments described above, said caliper body comprises at least two parts which are firmly connected to each other.

According to an embodiment, not necessarily to be provided together with the embodiments described above, said caliper body comprises at least two parts firmly connected to each other, a first one comprising the first wheel side elongated element 3 and at least one portion of the at least one elongated element connecting bridge 17; 18; 19, a second one comprising the second elongated element 9 on the side opposed to the wheel and at least the remaining portion of the at least one elongated element connecting bridge 17; 18; 19.

According to an advantageous embodiment, not necessarily to be provided together with the embodiments described above, said first wheel side elongated element 3 comprises at least one sliding element 151 adapted to make said first pad 14 slide biased by the thrust means 13 with respect to said caliper body 1.

According to an advantageous embodiment, not necessarily to be provided together with the embodiments described above, said brake disc 2 on which the caliper body is arranged astride, comprises a brake disc middle plane, or circumferential plane PC-PC, transversal to the rotational axis of the brake disc 2 and passing through its centerline. A supply pipe 34 of the control or brake fluid to the thrust means 13 extends from said thrust means 13 to a pipe inlet 35 arranged in a portion of the caliper body 1 placed in the centerline of the caliper body opposed to the wheel with respect to the circumferential plane PC-PC.

According to an advantageous embodiment, not necessarily to be provided together with the embodiments described above, said supply pipe 34 is obtained at least partially in the caliper body 1.

According to an advantageous embodiment, not necessarily to be provided together with the embodiments described above, said pipe inlet 35 substantially faces the side opposed to the wheel 6.

According to an advantageous embodiment, not necessarily to be provided together with the embodiments described above, said pipe inlet 35 is arranged near one of the portions defining a connecting seat 20, 21.

According to an advantageous embodiment, not necessarily to be provided together with the embodiments described above, a purge valve 36 and a control or brake fluid inlet connector 37 are associated with the single pipe inlet 35.

The present invention also relates to a brake caliper 37 which comprises at least one caliper body 1 as defined in any one of the embodiments described above.

The present invention also relates to a brake caliper support element 22 adapted to support a brake caliper 37 which comprises a caliper body 1 as defined in any one of the embodiments described above, wherein said support element 22 comprises at least two tines 39, 40, each comprising an element 41 for the connection to the caliper body, e.g. studs.

The present invention also relates to a disc brake 38 comprising a caliper 37 according to any one of the embodiments described above, and a disc brake 38 comprising a caliper 37 according to any one of the embodiments described above and a support element according to any one of the embodiments described above.

The present invention further relates to a motor vehicle comprising a disc brake 38 according to any one of the embodiments described above.

By virtue of the illustrated embodiments, a reduction of the manufacturing costs can be obtained in addition to the advantages listed above because, unlike a monoblock disc or a disc made in one piece, the caliper body suggested here has a piston zone, in particular the cylinders, which can be easily accessed by tools for a more accurate working. In this manner, the use of special equipment which must work in undercut position is avoided, thus also reducing the working cycle time.

Furthermore, it is possible to improve performance because the working temperature of the caliper is reduced with respect to the working temperatures of the known calipers. This reduction of the working temperature can be obtained by increasing the heat exchange surface (the heat is also distributed on the entire area of the support element or foot) promoting the heat exchange directly between pad and support and avoiding a high heat transmission to the caliper body itself.

Those skilled in art may make many changes and adaptations to the embodiments described above or may replace elements with others which are functionally equivalent in order to satisfy contingent needs without however departing from the scope of the appended claims.

LIST OF REFERENCES 1 disc brake caliper body
2 brake disc
3 first wheel side elongated element
4 first elongated element caliper outer side
5 first elongated element caliper inner side
6 vehicle wheel
7 first brake disc braking surface
8 second brake disc braking surface
9 elongated element on the side opposed to the wheel
10 second elongated element caliper outer side
11 second elongated element caliper inner side
12 thrust means seat
13 thrust means
14 first pad
15 pad resting surface
16 second opposed pad
17 elongated element connecting bridge disc inlet side in forward vehicle travel
18 central elongated element connecting bridge
19 elongated element connecting bridge disc outlet side in forward vehicle travel
20 portion defining a connecting seat
21 portion defining a connecting seat
22 support element
23 connecting portion of second elongated element on the side opposed to the wheel
24 central bridge outer side
25 weight reduction and heat discharge window
26 connecting resting plane 27 connecting resting plane
28 end bridge outer side
29 end bridge outer side
30 weight reduction and heat discharge window
31 connecting seat
32 connecting seat
33 finger-like portion
34 pipe
35 pipe inlet
36 purge valve
37 brake caliper
38 disc brake
39 support element tine
40 support element tine
41 element for the connection to the caliper body
42 resting counter-surfaces
43 resting counter-surfaces
44 stiffening support element
45 stiffening element resting surface
46 central bridge groove
47 motorcycle swingarm
48 further support element arm
49 connecting element seat
50 fixing elements
51 motor vehicle front fork hub
52 wheel axle seat
151 sliding element
A-A axial direction
R-R radial direction
C-C circumferential direction
PRM-PRM radial center plane of the caliper
PRM-PRM circumferential center plane of the caliper
PC-PC circumferential center plane of the brake disc

The invention claimed is:

1. A disc brake caliper body, of a fixed type, adapted to be arranged astride a brake disc of a floating type, or axially slidable, said brake disc comprising a first brake disc braking surface and an opposed second brake disc braking surface, said caliper body comprising:
 a first wheel side elongated element, comprising a first elongated element caliper outer side and a first elongated element caliper inner side, wherein said first elongated element caliper outer side is adapted to face a vehicle wheel and wherein the first elongated element caliper inner side is adapted to at least partially face, either directly or indirectly via a first pad, said first brake disc braking surface;
 a second elongated element on the side opposed to the wheel, comprising a second elongated element caliper outer side and a second elongated element caliper inner side, wherein the second elongated element caliper inner side is adapted to at least partially face, either directly or indirectly via a second opposed pad, said second brake disc braking surface;
 said first wheel side elongated element comprises at least one thrust device seat adapted to receive a thrust device adapted to bias the first pad against said first brake disc braking surface;
 said second elongated element on the side opposed to the wheel comprises at least one pad resting surface adapted for the at least partial resting of said second opposed pad avoiding this second pad from being biased by any thrust device movable with respect to the caliper body itself;
 said caliper body comprises at least one elongated element connecting bridge adapted to connect said first wheel side elongated element to said second elongated element on the side opposed to the wheel so as to be adapted to be arranged astride said brake disc;
wherein
 at least said second elongated element on the side opposed to the wheel comprises a connecting seat adapted for the connection of the caliper body to a support element for supporting the caliper to the vehicle; and wherein
 said at least one thrust seat faces freely in axial direction so that said at least one thrust seat is accessed entirely along straight directions parallel to the axial direction avoiding to interfere with said caliper body.

2. The caliper body according to claim 1, wherein:
 said second elongated element on the side opposed to the wheel comprises at least one connecting portion of said second elongated element on the side opposed to the wheel which mutually connects said connecting seat; and/or wherein
 said connecting portion of second elongated element on the side opposed to the wheel is adapted to at least partially face said second pad; and/or
wherein
 said connecting portion of second elongated element on the side opposed to the wheel is integral or in one piece at least partially with said connecting seat, and/or wherein
 said connecting seat is adapted to connect the caliper body with a support element for supporting the caliper to a wheel hub or wheel axle or swingarm.

3. The caliper body according to claim 1, wherein a first disc inlet end bridge and a second disc outlet end bridge are comprised, and wherein said connecting seat is provided at said first and second end bridges.

4. The caliper body according to claim 3, wherein said first and second end bridges extend so as to be arranged astride the brake disc along an axial direction substantially parallel to the rotational axis of the brake disc; and/or wherein
 said connecting seats are aligned with said end bridges, and extend along an axial direction; and/or wherein
 said connecting seat forms at least two connecting resting planes oriented according to a plane extending along a radial direction, transverse to the rotational axis of the disc; and/or wherein
 said connecting seats are aligned with said end bridges, and extend along a direction which is either radial or parallel to a radial axis and parallel with each other; and/or wherein
 said connecting seat forms at least two connecting resting planes oriented according to a plane extending along an axial direction, or passing through an axis which is parallel to the rotational axis of the disc and orthogonal to a radial axis passing through the centerline of the caliper body, or centerline radial plane of the caliper.

5. The caliper body according to claim 3, wherein each of said end bridges has an end bridge outer side facing outside the caliper body in the circumferential direction, and wherein said outer side is circumferentially tapered away from the centerline radial plane of the caliper.

6. The caliper body according to claim 5, further comprising at least one central bridge having a central bridge outer side facing outside the caliper body, and wherein said central bridge outer side radially tapers radially away from the caliper body.

7. The caliper body according to claim 6, wherein said central bridge outer side has at least one central bridge groove extending along at least one section of said central bridge; and/or wherein said at least one central bridge groove is made of two central bridge grooves arranged on sloping surfaces of the central bridge tapered side; and/or wherein said central bridge and said end bridges are mutually spaced apart in circumferential direction forming at least one weight reduction and heat discharge window.

8. The caliper body according to claim 2, wherein said connecting seats delimited by said connecting seat are aligned with said connecting portion of second elongated element on the side opposed to the wheel; and/or wherein said connecting portion of second elongated element on the side opposed to the wheel forms a rest for said second opposed pad.

9. The caliper body according to claim 1, wherein:

said caliper body is in one piece; and/or wherein said caliper body comprises at least two parts firmly connected to each other;

and/or wherein said caliper body comprises at least two parts firmly connected to each other, a first one comprising the first wheel side elongated element, and a second one comprising the second elongated element on the side opposed to the wheel;

and/or wherein said first wheel side elongated element comprises at least one sliding element adapted for the sliding of said first pad biased by the thrust device with respect to said caliper body.

10. The caliper body according to claim 1, wherein:

said brake disc, on which the caliper body is arranged astride, comprises a brake disc centerline plane, or circumferential plane transverse to the rotational axis of the brake disc and passing through its centerline; and wherein a control or brake fluid supply conduit to the thrust device extends from said thrust device to a conduit inlet arranged at least partially within the caliper body arranged in the centerline of the caliper body opposed to the wheel with respect to the circumferential plane; and/or wherein said supply conduit is obtained at least partially in the caliper body; and/or wherein said conduit inlet substantially faces the side opposed to the wheel; and/or wherein said conduit inlet is arranged near said connecting seat; and/or wherein a purge valve and a control or brake fluid inlet connector are associated with the conduit inlet.

* * * * *